(12) United States Patent
Kawaguchi et al.

(10) Patent No.: US 8,108,936 B2
(45) Date of Patent: Jan. 31, 2012

(54) CONTENT DISTRIBUTION SERVER AND CONTENT PLAYBACK CONTROL TERMINAL

(75) Inventors: Toru Kawaguchi, Setagaya-ku (JP); Yutaka Saito, Ota-ku (JP)

(73) Assignee: Panasonic Corporation, Osaka (JP)

( * ) Notice: Subject to any disclaimer, the term of this patent is extended or adjusted under 35 U.S.C. 154(b) by 359 days.

(21) Appl. No.: 10/576,952

(22) PCT Filed: Oct. 25, 2004

(86) PCT No.: PCT/JP2004/015807
§ 371 (c)(1),
(2), (4) Date: Apr. 24, 2006

(87) PCT Pub. No.: WO2005/041576
PCT Pub. Date: May 6, 2005

(65) Prior Publication Data
US 2007/0079380 A1  Apr. 5, 2007

(30) Foreign Application Priority Data

Oct. 27, 2003 (JP) .................................. 2003-366604
Oct. 22, 2004 (JP) .................................. 2004-308807

(51) Int. Cl.
*G06F 7/04* (2006.01)
(52) U.S. Cl. .......................................... 726/27; 713/193
(58) Field of Classification Search ........................ None
See application file for complete search history.

(56) References Cited

U.S. PATENT DOCUMENTS

| | | | |
|---|---|---|---|
| 5,796,828 A | 8/1998 | Tsukamoto et al. | |
| 6,208,801 B1 * | 3/2001 | Kambayashi et al. | 386/95 |
| 6,304,715 B1 * | 10/2001 | Abecassis | 386/68 |
| 7,092,615 B2 * | 8/2006 | Tanikawa et al. | 386/69 |
| 7,197,758 B1 * | 3/2007 | Blackketter et al. | 725/37 |
| 2001/0044786 A1 * | 11/2001 | Ishibashi | 705/77 |
| 2002/0002466 A1 | 1/2002 | Kambayashi et al. | |
| 2002/0006204 A1 * | 1/2002 | England et al. | 380/269 |
| 2002/0049679 A1 * | 4/2002 | Russell et al. | 705/52 |
| 2002/0065816 A1 * | 5/2002 | Tsusaka et al. | 707/3 |
| 2002/0109707 A1 * | 8/2002 | Lao et al. | 345/700 |
| 2002/0138745 A1 | 9/2002 | Cognigni et al. | |
| 2002/0191950 A1 * | 12/2002 | Wang | 386/46 |
| 2003/0007664 A1 * | 1/2003 | Davis et al. | 382/100 |

(Continued)

FOREIGN PATENT DOCUMENTS

EP  0975165  1/2000

(Continued)

OTHER PUBLICATIONS

English Language Abstract of JP 2002-342518.

(Continued)

*Primary Examiner* — David Pearson
(74) *Attorney, Agent, or Firm* — Greenblum & Bernstein, P.L.C.

(57) ABSTRACT

In the present invention, a content distribution server distributes a content key, encrypted content encrypted using the content key, and playback control information describing a playback mode restriction for a specific section of content, to a content playback terminal, and the content playback terminal refers to the playback control information, and decodes and plays back encrypted content in the case of a playback mode in which the specific section of content is not restricted. By this means, the playback mode of a specific section of content can be restricted based on playback control information.

11 Claims, 24 Drawing Sheets

U.S. PATENT DOCUMENTS

| | | | |
|---|---|---|---|
| 2003/0046238 A1* | 3/2003 | Nonaka et al. | 705/51 |
| 2003/0048907 A1 | 3/2003 | Nakahara et al. | |
| 2003/0123851 A1* | 7/2003 | Schaefer et al. | 386/68 |
| 2004/0047588 A1* | 3/2004 | Okada et al. | 386/46 |
| 2004/0093494 A1* | 5/2004 | Nishimoto et al. | 713/165 |
| 2004/0133794 A1* | 7/2004 | Kocher et al. | 713/193 |
| 2004/0139027 A1* | 7/2004 | Molaro | 705/59 |
| 2004/0193902 A1* | 9/2004 | Vogler et al. | 713/193 |

FOREIGN PATENT DOCUMENTS

| | | |
|---|---|---|
| EP | 1209914 | 5/2002 |
| JP | 11-283327 | 10/1999 |
| JP | 2001-175606 | 6/2001 |
| JP | 2002-259275 | 9/2002 |
| JP | 2002-290878 | 10/2002 |
| JP | 2002-342518 | 11/2002 |
| JP | 2003-101949 | 4/2003 |
| JP | 2003-143547 | 5/2003 |

OTHER PUBLICATIONS

English Language Abstract of JP 2001-175606.
Japan Office Action dated on Mar. 1, 2011.
Search report from E.P.O., mail date is Nov. 14, 2011.

* cited by examiner

500

```
<complexType name="PlayControl">
  <sequence>
    <elememt name="play" type="ModeType"/>
    <elememt name="stop" type="ModeType"/>
    <elememt name="pause" type="ModeType"/>
    <elememt name="forward" type="ModeType"/>
    <elememt name="rewind" type="ModeType"/>      } 501
    <elememt name="skip" type="ModeType"/>
    <elememt name="jump" type="ModeType"/>
    <elememt name="record" type="ModeType"/>
    <elememt name="copy" type="ModeType"/>
  </sequence>
  <attribute name="segmentRef" type="tva:TVAIDType" use="required"/>
</complexType>
<complexType name="ModeType">
  <attribute name="mode" type="boolean" default="false"/>    ~ 502
</complexType>
```

FIG. 5

```
<ProgramDescription>
  <SegmentInformation Table>
    <SegmentList>                    603a
      <SegmentInformation segmentId="S27A67758-E714-4a4e-B994-
        3B650A443699">
        <ProgramRef crid="crid://sport.com/football/match10"/>
        <Description>    604a
          <Title xml:lang="ja">
            Japan vs England(1st half)   601a
          </Title>
          <Synopsis xml:lang="ja">
            World Cup soccer final   602a
            Japan vs England
            1st half
          </Synopsis>
        </Description>                          605a
        <SegmentLocator>
          <mpeg7:MediaRelIncrTimePoint media TimeUnit="PT1N25F">
            0                                    606a
          </mpeg7:MediaRelIncrTimePoint>
          <mpeg7:MediaIncrDuration media TimeUnit="PT1N25F">
            450000
          </mpeg7:MediaIncrDuration>
        </SegmentLocator>        603b
      </SegmentInformation>
      <SegmentInformation segmentId="S046C7C0F-BF83-4b4d-969E-
        204E8E82CF7C ">
        <ProgramRef crid="crid://sport.com/football/match10"/>
        <Description>
          <Title xml:land="ja">   604b
            Japan vsEngland (CM)   601b
          </Title>
          <Synopsis xml:lang="ja">
            Sponsor    602b
            panasonic
          </Synopsis>
        </Description>                          605b
        <SegmentLocator>
          <mpeg7:MediaRelIncrTimePoint mediaTimeUnit="PT1N25F">
            450000                               606b
          </mpeg7:MediaRelIncrTimePoint>
          <mpeg7:MediaIncrDuration mediaTimeUnit="PT1N25F">
            500000
          </mpeg7:MediaIncrDuration>
        </SegmentLocator>
      </SegmentInformation>
```

FIG. 6

```xml
<SegmentInformation segmentId="S5117353A-F598-4del-968E-
    8C3D134C7642">
  <ProgramRef crid="crid://sport.com/football/match10"/>
  <Description>
    <Title xml:lang="ja">
      Japan vs England(2nd half)
    </Title>
    <Synopsis xml:lang="ja">
      World Cup soccer final
      Japan vs England
      2nd half
    </Synopsis>
  </Description>
  <SegmentLocator>
    <mpeg7:MediaRelIncrTimePoint media TimeUnit="PT1N25F">
      500000
    </mpeg7:MediaRelIncrTimePoint>
    <mpeg7:MediaIncrDuration media TimeUnit="PT1N25F">
      950000
    </mpeg7:MediaIncrDuration>
  </SegmentLocator>
</SegmentInformation>
</SegmentList>
<SegmentGroupList>
  <SegmentGroupInformation groupId="G92F0C707-2ECB-403a-88FC->
      89EEF7961034"
    <ProgramRef crid="CRID://sport.com/footaball/match10"/>
    <GroupType xsi:type="SegmentGroupTypeType" value="highlights/events"/>
    <Description>
      <Title xml:lang="ja">World Cup soccer final</Title>
      <Synopsis xml:lang="ja">Japan vs England</Synopsis>
    </Description>
    <Segments refList="S27A67758-E714-4a4e-B994-3B650A443699>
        S046C7C0F-BF83-4b4d-969E-204E8E82CF7C
        S5117353A-F598-4del-968E-8C3D134C7642"/>
    <PlayControl segmentRef="S046C7C0F-BF83-4b4d-969E-204E8E82CF7C">
      <forward mode="false/">
      <Skip mode="false"/>
      <Jump mode="false"/>
    </PlayControl>
  </SegmentGroupInformation>
</SegmentGroupList>
</SegmentInformationTable>
</ProgramDescription>
```

FIG. 7

```
<complexType name="SegmentInformationType">
  <sequence>
    (...)
    <element name="ViewingRestriction" type="ViewingRestrictionType" />
  </sequence>
</complexType>

<complexType name="ViewingRestrictionType">              ⎫
  <sequence>                                              ⎬ 1201
    <element name="TimeRange" type="TimeRangeType" />     ⎪
  </sequence>                                             ⎭
</complexType>

<complexType name="TimeRangeType">                                                      ⎫
  <attribute name="enable" type="boolean" use="optional"/>        ~1208                  ⎪
  <attribute name="start" type="time" use="optional"/>            ~1203                  ⎬ 1202
  <attribute name="end" type="time" use="optional"/>              ~1204                  ⎪
  <attribute name="queryLocation" type="queryLocationType" use="optional" /> ~1205       ⎭
</complexType>

<simpleType name="queryLocationtype">
  <restriction base="string">
    <enumeration value="terminal"/>   ~1206
    <enumeration value="server"/>     ~1207
  </restriction>
</simpleType>
```

```
<SegmentInformation segmentId="S5117353A-F598-4de1-968E-    ~1301
8C3D134C7642">
  <ProgramRef crid="crid://sport.com/football/match10"/>    ~1302
  <Description>
    <Title xml:lang="ja">
      Japan vs England(2nd half)    ~1303
    </Title>
    <Synopsis xml:lang="ja">
      World Cup soccer final    ~1304
      Japan vs England
      2nd half
    </Synopsis>
  </Description>
  <SegmentLocator>
    <mpeg7:MediaRelIncrTimePoint media TimeUnit="PT1N25F" >
      500000
    </mpeg7:MediaRelIncrTimePoint>                                          }1305
    <mpeg7:MediaIncrDuration media TimeUnit="PT1N25F">
      950000
    </mpeg7:MediaIncrDuration>
  </SegmentLocator>
  <ViewingRestriction>           1309    1307
    <TimeRange enable="false" start="19:00:00.00" end="21:00:00.00"    }1306
    queryLocation="server" />
  </ViewingRestriction>
</SegmentInformation>
```
1300 (left), 1310 (left)

FIG.13

```
<compleType name="SegmentInformationType">
  <sequence>
    (...)
    <element name="ViewingRestriction" type="ViewingRestrictionType" />
    (...)
  </sequence>
</complexType>

<compleType name="ViewingRestrictionType">
  <sequence>
    <element name="BrightnessRange" type="BrightnessRangeType" />
  </sequence>
</complexType>

<compleType name="BrightnessRangeType">
  <attribute name="enable" type="boolean" use="optional"/>
  <attribute name="minimum" type="nonNegativeInteger" use="optional"/>
  <attribute name="maximum" type="nonNegativeInteger" use="optional"/>
</complexType>
```

```
<SegmentInformation segmentId="S5117353A-F598-4de1-968E-    ~1301
8C3D134C7642">
<ProgramRef crid="crid://sport.com/football/match10"/>   ~1302
<Description>
  <Title xml:lang="ja">
  Japan vs England(2nd half)    ~1303
  </Title>
  <Synopsis xml:lang="ja">
  World Cup soccer final    ~1304
  Japan vs England
  2nd half
  </Synopsis>
</Description>
<SegmentLocator>
<mpeg7:MediaRelIncrTimePoint media TimeUnit="PT1N25F">
500000
</mpeg7:MediaRelIncrTimePoint>
<mpeg7:MediaIncrDuration media TimeUnit="PT1N25F">
950000
</mpeg7:MediaIncrDuration>
</SegmentLocator>
<ViewingRestriction>
<BrightnessRange enable="true" minimum="1500" />
</ViewingRestriction>
</SegmentInformation>
```

```
<complexType name="SegmentInformationType">
  <sequence>
  (...)
  <element name="ViewingRestriction" type="ViewingRestrictionType" />
  </sequence>
</complexType>

<complexType name="ViewingRestrictionType">                    ⎫
  <sequence>                                                    ⎬ 2001
  <element name="UserAge" type="UserAreaType" />                ⎭
  </sequence>
</complexType>

<complexType name="UserAgeType">                                              ⎫
  <attribute name="enable" type="boolean" use="optional"/>                    ⎫
  <attribute name="minimum" type="nonNegativeInteger" use="optional"/> ~2003  ⎬ 2002
  <attribute name="maximum" type="nonNegativeInteger" use="optional"/>        ⎭
</complexType>
```

2004 — attribute name="enable"
2005 — attribute name="minimum"

```
<SegmentInformation segmentId="S5117353A-F598-4de1-968E-
8C3D134C7642">                                              ~ 1301
  <ProgramRef crid="crid://sport.com/football/match10"/>    ~ 1302
  <Description>
    <Title xml:lang="ja">
    Japan vs England(2nd half)                              ~ 1303
    </Title>
    <Synopsis xml:lang="ja">
    World Cup soccer final                                  ~ 1304
    Japan vs England
    2nd half
    </Synopsis>
  </Description>
  <SegmentLocator>
    <mpeg7:MediaRelIncrTimePoint media TimeUnit="PT1N25F">  ⎫
    500000                                                  ⎪
    </mpeg7:MediaRelIncrTimePoint>                          ⎬ 1305
    <mpeg7:MediaIncrDuration media TimeUnit="PT1N25F">      ⎪
    950000                                                  ⎪
    </mpeg7:MediaIncrDuration>    2103                      ⎭
  </SegmentLocator>             2102                        ⎫
  <ViewingResrtiction>                                      ⎪
    <UserAge enable="true" minimum="20" />                  ⎬ 2101
  </ViewingRestriction>                                     ⎪
</SegmentInformation>                                       ⎭
```

FIG.21

```
<complexType name="SegmentInformationType">
 <sequence>
  (...)
  <element name="ViewingRestriction" type="ViewingRestrictionType" />
  (...)
 </sequence>
</complexType>

<complexType name="ViewingRestrictionType">     ⎫
 <sequence>                                     ⎬ 2301
  <element name="Area" type="AreaType" />       ⎪
 </sequence>                                    ⎪
</complexType>                                  ⎭

<complexType name="AreaType">                                              ⎫
 <attribute name="enable" type="boolean" use="optional"/>  — 2304          ⎬ 2302
 <attribute name="name" type="string" use="optional"/>  — 2303             ⎪
</complexType>                                                             ⎭
```

Figure 24:
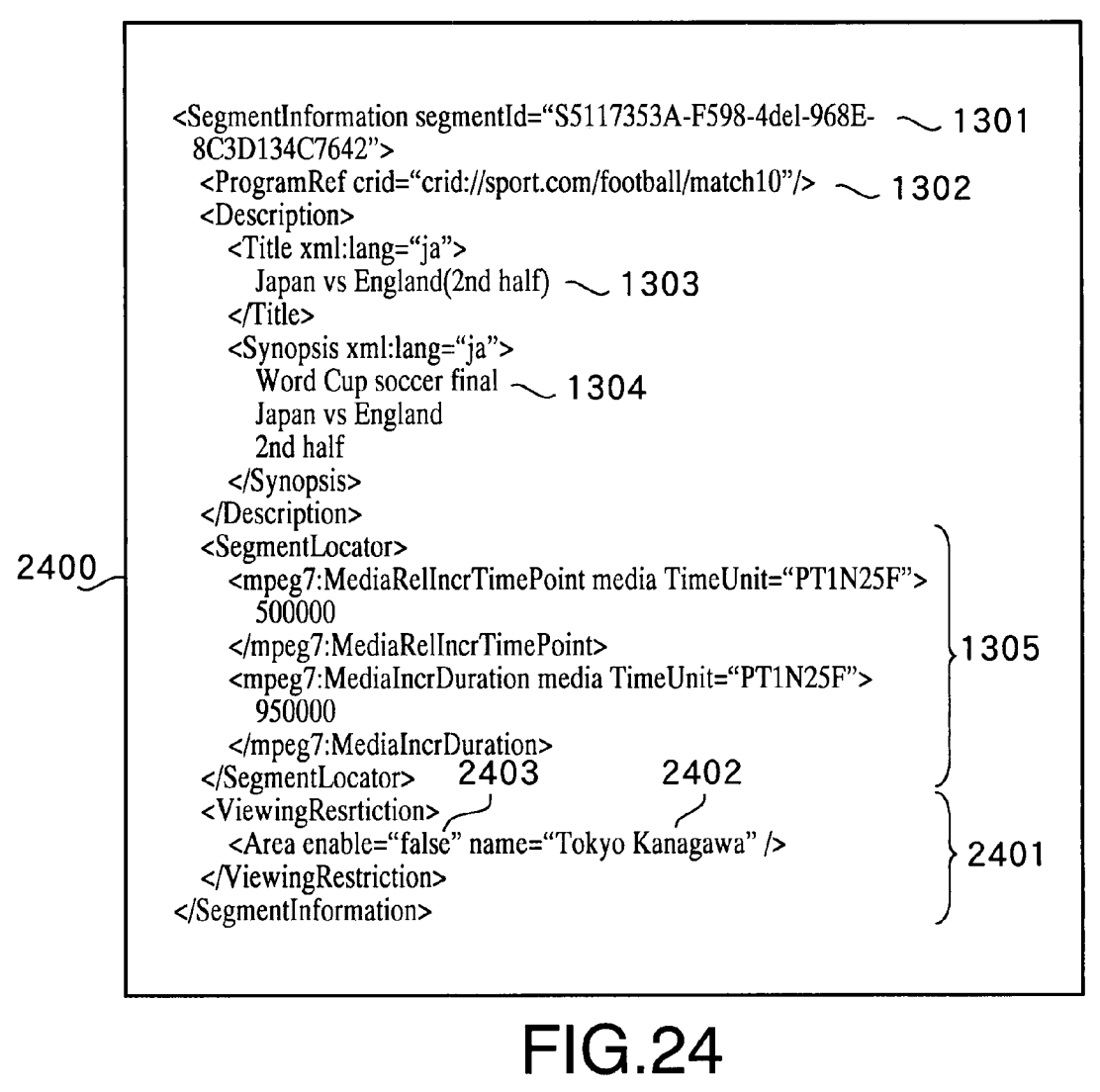

```
<SegmentInformation segmentId="S5117353A-F598-4de1-968E-    ~1301
8C3D134C7642">
  <ProgramRef crid="crid://sport.com/football/match10"/>  ~1302
  <Description>
    <Title xml:lang="ja">
      Japan vs England(2nd half)  ~1303
    </Title>
    <Synopsis xml:lang="ja">
      Word Cup soccer final  ~1304
      Japan vs England
      2nd half
    </Synopsis>
  </Description>
  <SegmentLocator>                                    ⎫
    <mpeg7:MediaRelIncrTimePoint media TimeUnit="PT1N25F">  ⎪
      500000                                               ⎪
    </mpeg7:MediaRelIncrTimePoint>                          ⎬ 1305
    <mpeg7:MediaIncrDuration media TimeUnit="PT1N25F">     ⎪
      950000                          2402                 ⎪
    </mpeg7:MediaIncrDuration>                              ⎭
  </SegmentLocator>          2403                        ⎫
  <ViewingRestriction>                                   ⎪
    <Area enable="false" name="Tokyo Kanagawa" />       ⎬ 2401
  </ViewingRestriction>                                  ⎪
</SegmentInformation>                                    ⎭
```

CONTENT DISTRIBUTION SERVER AND CONTENT PLAYBACK CONTROL TERMINAL

TECHNICAL FIELD

The present invention relates to a content distribution server that distributes content using a broadcast network or IP network channel and a content playback control terminal that controls playback of content distributed from a content distribution server.

BACKGROUND ART

There is a conventional digital content distribution system that uses DRM (Digital Rights Management) technology (refer to Patent Document 1) DRM technology enables usage restrictions relating to the number of playback times, transfer, duplication, and so forth to be set for distributed content.

Also, there is a conventional digital content distribution system that uses metadata stipulated by the TV-Anytime forum. According to the method stipulated by the TV-Anytime forum, the contents of a specific section of content (such as a CM, the first inning of a baseball game, or the first half of a soccer match) are described by means of segmentation metadata.

In recent years, the increased capacities of HDDs installed in PVRs (Personal Video Recorders) and an automatic recording function have made it possible for a program to be recorded automatically and viewed by the user later. However, since special playback such as 30-second skipping, fast-forwarding, and jumping to a specified time can be freely used in recorded viewing, CMs are frequently skipped when a program is viewed, and the current CM business model in real-time broadcasting is becoming nonviable.

Also, even if it is wished to apply a broadcasting type of CM business model to content downloaded via an IP network, it is difficult to implement this since special playback can be freely performed with a playback player. However, in solving these problems, even though the number of times content is played back can be restricted by means of conventional DRM technology, there is no way of restricting the playback method, such as special playback. Furthermore, although it is possible to describe a specific section of a program as a CM section by means of segmentation metadata, there is no way of restricting special playback and so forth only for that section.

Patent Document 1: Unexamined Japanese Patent Publication No. 2002-342518

DISCLOSURE OF INVENTION

Problems to be Solved by the Invention

However, the above conventional technology has a problem that there is no technique whereby playback control intended by a broadcaster performs restriction for individual specific sections of a program.

The present invention has been implemented taking into account the problems described above, and it is an object of the present invention to make it possible for the playback mode to be restricted for individual specific sections of content.

Means for Solving the Problems

In the present invention, a content distribution server distributes a content key, encrypted content encrypted using the content key, and playback control information that describes playback mode restrictions for a specific section of content to a content playback terminal, and the content playback terminal refers to the playback control information and decodes and plays back encrypted content in the case of a playback mode in which a specific section of content is not restricted.

Advantages of the Invention

According to the present invention, playback of a specific section of content can be restricted based on playback control information.

BRIEF DESCRIPTION OF DRAWINGS

FIG. 5 is a drawing showing an example of the schema of playback control information in a content playback control system of Embodiment 1;

FIG. 6 is a first drawing showing an example of metadata of playback control information in a content playback control system of Embodiment 1;

FIG. 7 is a second drawing showing an example of metadata of playback control information in a content playback control system of Embodiment 1;

FIG. 12 is a drawing showing an example of the schema of playback control information in a content playback control system of Embodiment 2;

FIG. 13 is a drawing showing an example of metadata of playback control information in a content playback control system of Embodiment 2;

FIG. 16 is a drawing showing an example of the schema of playback control information in a content playback control system of Embodiment 3;

FIG. 17 is a drawing showing an example of metadata of playback control information in a content playback control system of Embodiment 3;

FIG. 20 is a drawing showing an example of the schema of playback control information in a content playback control system of Embodiment 4;

FIG. 21 is a drawing showing an example of metadata of playback control information in a content playback control system of Embodiment 4;

FIG. 23 is a drawing showing another example of the schema of playback control information in a content playback control system of Embodiment 4; and FIG. 24 is a drawing showing another example of metadata of playback control information in a content playback control system of Embodiment 4.

BEST MODES FOR CARRYING OUT THE INVENTION

Content playback control systems according to embodiments of the present invention will now be described in detail with reference to the accompanying drawings.

Embodiment 1

Figure 1:
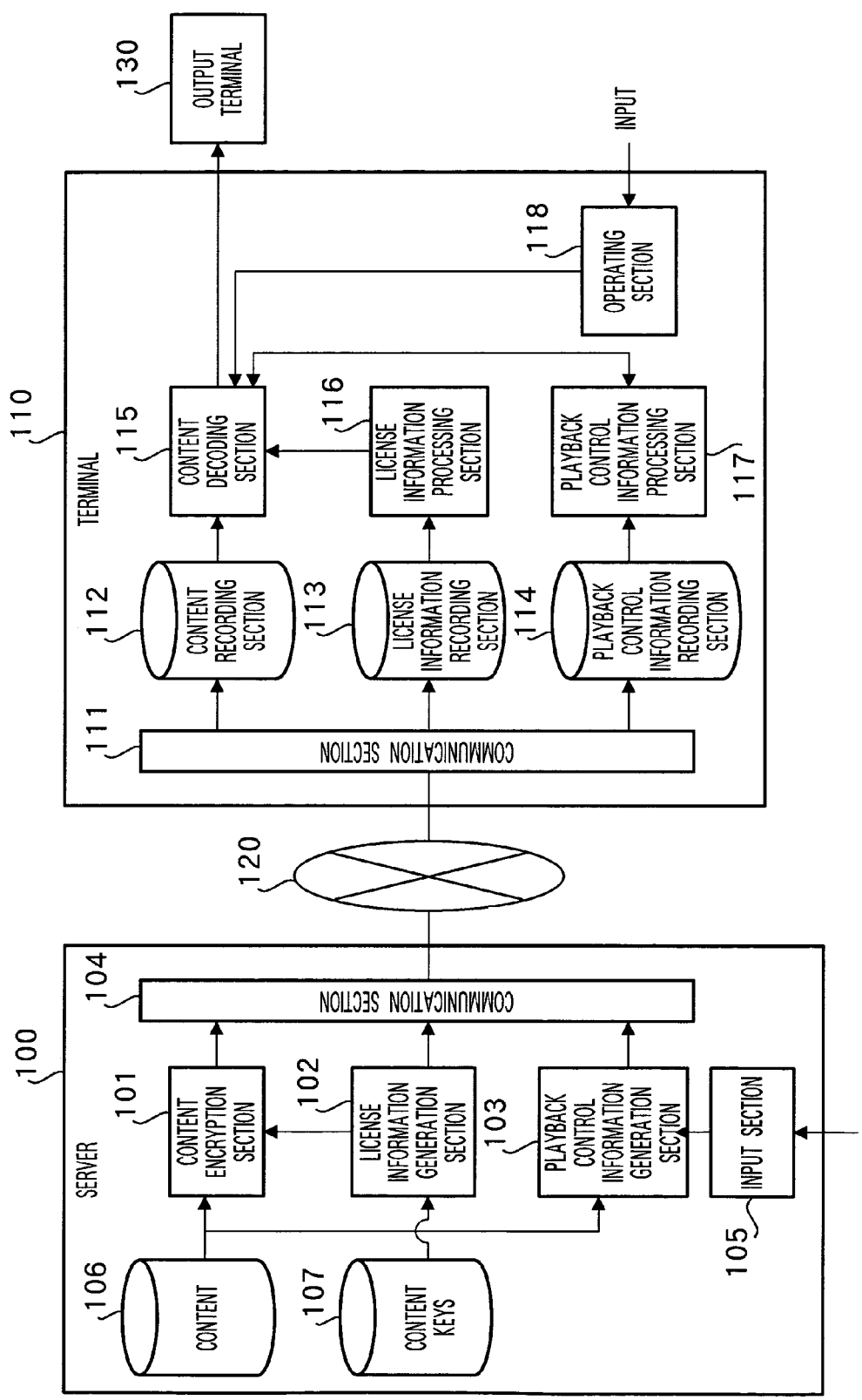
FIG. 1 is a block diagram showing the configuration of a content playback control system according to Embodiment 1 of the present invention.

FIG. 1 is a block diagram showing the configuration of a content playback control system according to Embodiment 1 of the present invention. In FIG. 1, a content playback control system has a configuration in which content distribution server (hereinafter referred to as "server") 100 serving as a transmitting apparatus of encrypted content, license information, and playback control information, and content playback control terminal (hereinafter referred to as "terminal") 110, are connected via a broadcast network, IP network, or suchlike channel 120.

Server 100 generates encrypted content, license information, and playback control information, and transmits these to terminal 110 via a broadcast network, IP network, or suchlike channel 120.

Server 100 has content encryption section 101, license information generation section 102, playback control information generation section 103, communication section 104, input section 105, content storage section 106, and content key storage section 107.

Server 100 according to Embodiment 1 is just one configuration example, and license information generation section 102, playback control information generation section 103, content storage section 106, and content key storage section 107 may be separate servers. Actually, possible patterns include a case where playback control information is produced by a content producer, a case where playback control information is produced by a content distributor, a case where there is a provider who produces only playback control information, and so forth. Therefore, the server in which playback control information generation section 103 is located will vary according to these various cases.

Content control information stored in content storage section 106, that is, information that restricts the content playback mode, is input to playback control information generation section 103 from input section 105. Playback control information generation section 103 also has content stored in content storage section 106 as input, and analyzes content section information. Playback control information generation section 103 then establishes correspondence between the analyzed section information and control information input from input section 105, and generates playback control information for controlling the content playback method.

Playback control information will be described in detail later.

License information generation section 102 generates license information containing a content key for encrypting content, stored in content key storage section 107, and content key usage conditions for permitting only playback based on playback control information.

Content encryption section 101 encrypts content using the content key contained in the license information generated by license information generation section 102, and transmits this encrypted content to communication section 104.

Communication section 104 is a section that performs data transmission/reception to/from terminal 110, and transmits encrypted content to terminal 110 via broadcast network, IP network, or suchlike channel 120.

The method of transmitting license information generated by the license information generation section to terminal 110 via communication section 104 may be based on conditional access scheme, public key cryptography, or the like.

Terminal 110 receives encrypted content, license information, and playback control information from server 100 via broadcast network, IP network, or suchlike channel 120, and if playback based on the playback control information is permitted according to usage conditions of the license information, plays back content based on the playback control information.

Terminal 110 has communication section 111, content recording section 112, license information recording section 113, playback control information recording section 114, content decoding section 115, license information processing section 116, playback control information processing section 117, and operating section 118.

Communication section 111 performs reception of data from server 100 via broadcast network or IP network channel 120.

Content recording section 112 is a recording medium for recording encrypted content received by communication section 111 or obtained from other recording mediums, and more specifically, is an HDD, DVD-RAM, an SD memory card, volatile memory, nonvolatile memory, an IC card, or the like. By this means, encrypted content can be obtained from server 100 before being used, and encrypted content can also be obtained via other storage media.

License information recording section 113 is a recording medium for recording license information received by communication section 111 or obtained from other recording medium, and more specifically, is an HDD, DVD-RAM, volatile memory, nonvolatile memory, an IC card, a memory card, or the like. By this means, license information can be obtained from server 100 before being used, and license information can also be obtained via other storage media.

Playback control information recording section 114 is a recording medium for recording playback control information received by communication section 111 or obtained from other recording medium, and more specifically, is an HDD, DVD-RAM, an SD memory card, volatile memory, nonvolatile memory, an IC card, or the like. By this means, playback control information can be obtained from server 100 before being used, and playback control information can also be obtained via other storage media.

Using a content key passed from license information processing section 116, content decoding section 115 decodes encrypted content recorded in content recording section 112, and transmits this content to output terminal 130.

Output terminal 130 is a terminal that outputs content, and is composed of a monitor that displays images, a speaker that outputs sound, and so forth.

Content decoding section 115 must comply with license information usage conditions. Therefore, if "only playback based on playback control information is permitted" is specified in usage conditions, content decoding section 115 is not permitted to perform normal playback, and performs playback processing in accordance with the playback control information.

License information processing section 116 obtains license information containing a content key and usage conditions from license information recording section 113, and only if the usage conditions are met, passes the content key to content decoding section 115 and permits decoding of encrypted content.

Here, as in the description of license information generation section 102, "only playback based on playback control information is permitted"is added to the usage conditions in addition to conditions that can be set with conventional DRM. License information is protected from unauthorized duplication or tampering by means of DRM technology.

Playback control information processing section 117 controls playback of content in content decoding section 115 based on playback control information. To be specific, when, for example, prohibition of skipping a CM section—which is a specific section—has been set in playback control information, if a skip operation is performed by operating section 118 during CM content playback, playback control information processing section 117 instructs content decoding section 115 to deny this operation.

Operating section 118 accepts content playback operations from the user. Specifically, operating section 118 accepts operations such as play, stop, pause, rewind, forward, skip, jump, record, or the like.

In the above configuration, content decoding section 115, license information processing section 116, and playback control information processing section 117 can be made tamper-proof security modules, enabling unauthorized duplication of or tampering with content, license information, and playback control information to be prevented.

Figure 2:
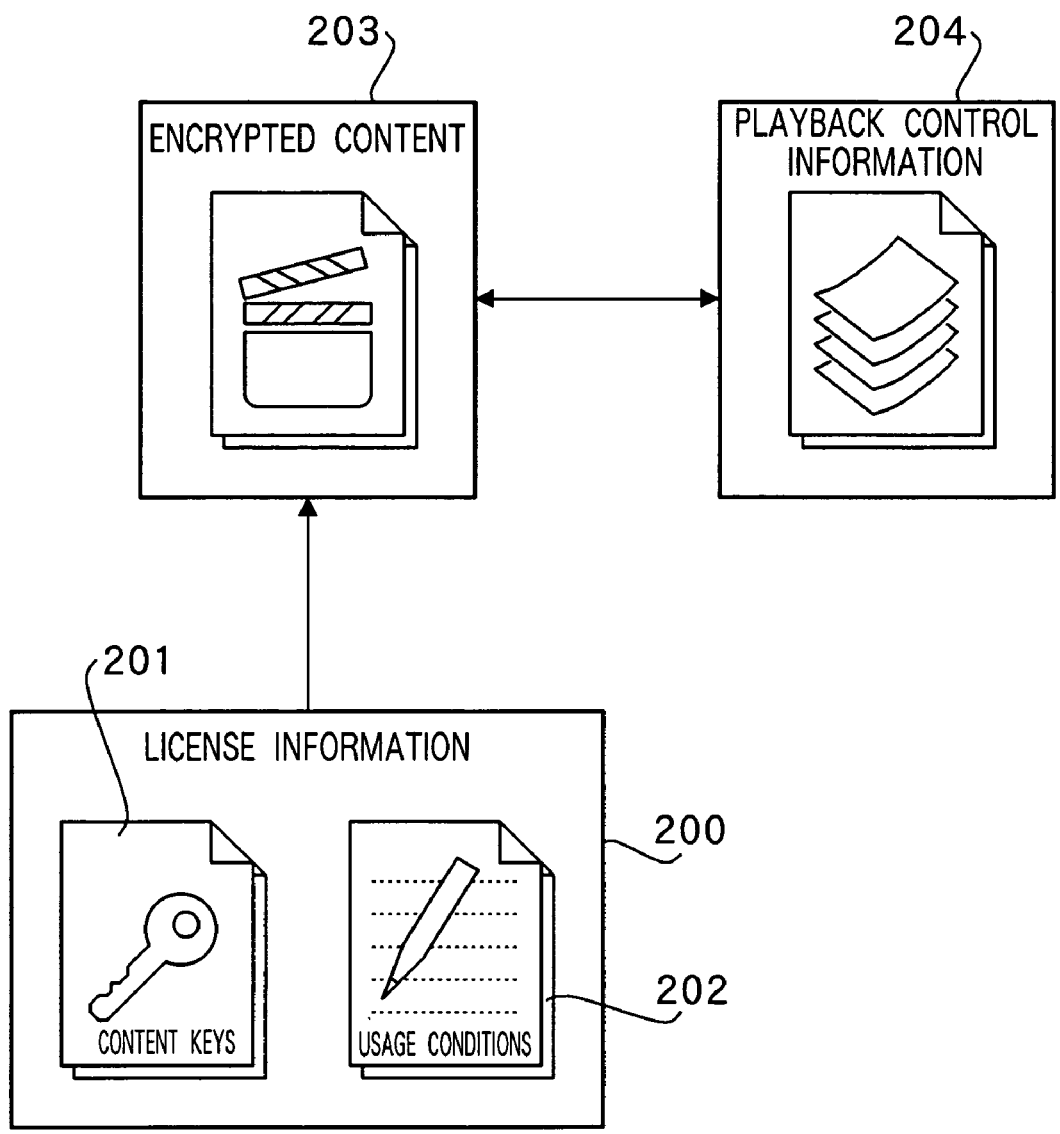
FIG. 2 is a conceptual drawing showing the relationship between license information for encrypted content and playback control information in a content playback control system of Embodiment 1.

License information will now be described using FIG. 2. FIG. 2 is a conceptual drawing showing the relationship between license information, and playback control information and encrypted content.

As shown in FIG. 2, license information 200 is composed of content keys 201 used when content encryption section 101 generates encrypted content 203, and usage conditions 202.

In usage conditions 202, in addition to usage restriction conditions relating to the number of playback times, transfer, duplication, and so forth that can be set with conventional DRM, information has been added indicating that only playback based on playback control information 204 generated by playback control information generation section 103 is permitted.

This makes it possible for playback based on playback control information 204 to be performed by terminal 110 using usage conditions 202. License information is protected from unauthorized duplication or tampering by means of DRM technology.

Figure 3:
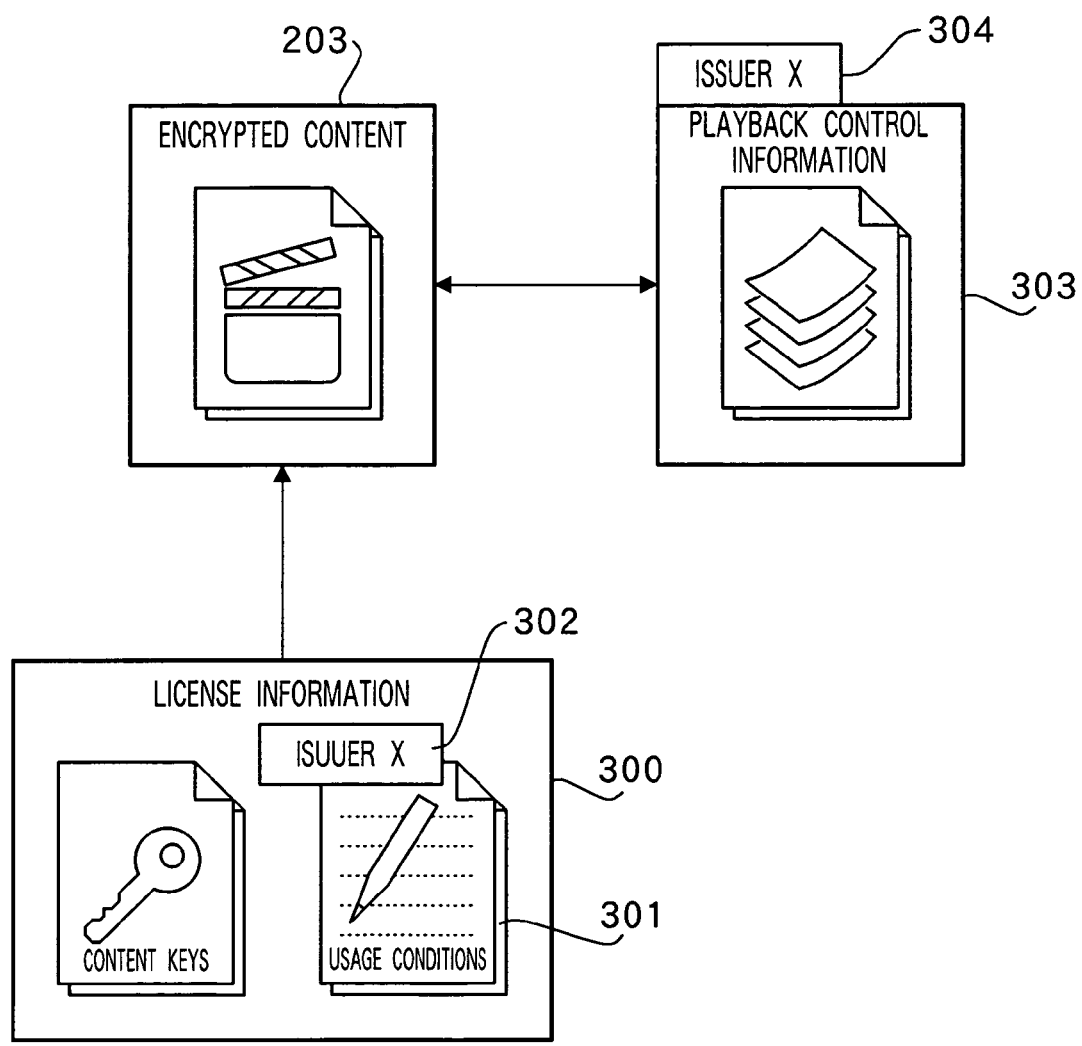
FIG. 3 is a conceptual drawing showing relationships when issuer identification information is attached to license information for encrypted content and playback control information in a content playback control system of Embodiment 1.

Another form of license information will now be described using FIG. 3. FIG. 3 is a conceptual drawing showing relationships when issuer identification information is attached to license information for encrypted content and playback control information in a content playback control system of this embodiment.

As shown in FIG. 3, issuer identification information 304 for identifying the issuer of playback control information 303 is attached to playback control information 303, and issuer identification information 302 is also attached to usage conditions 301.

By using such license information 300 that uses usage conditions 301, playback based only on playback control information 303 to which issuer identification information 304 that matches issuer identification information 302 attached to usage conditions 301 is attached can be made possible for terminal 110. That is to say, it is possible for only playback based on playback control information 303 to which specified issuer identification information 304 is attached to be permitted for terminal 110.

As a result, terminal 110 (that is, license information processing section 116 of the terminal) can be made to comply with the intended playback of the issuer of playback control information 303. It is also possible to attach a uniquely identifiable identifier to playback control information 303 other than above-described issuer identification information 304, and have license information processing section 116 of terminal 110 perform the same processing.

Figure 4:
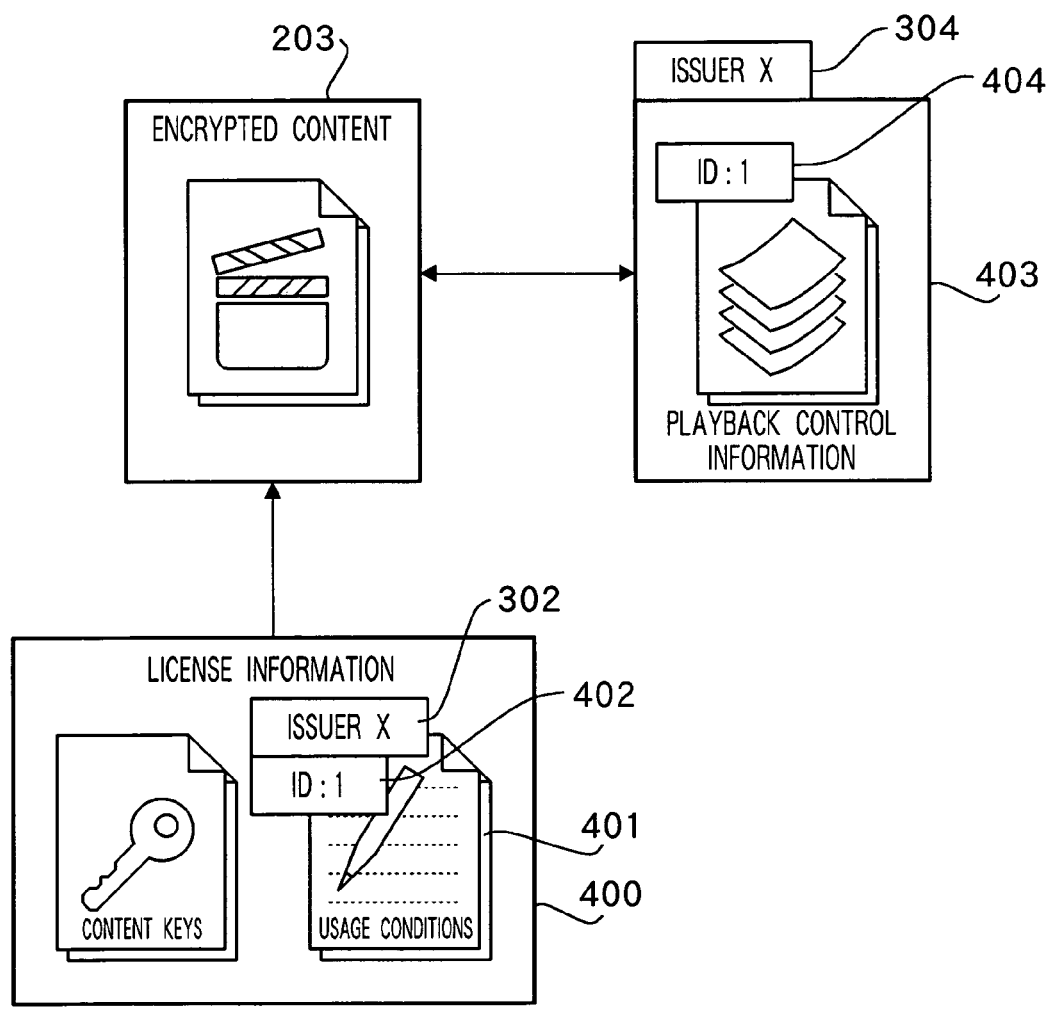
FIG. 4 is a conceptual drawing showing relationships when issuer identification information and an ID are attached to license information and playback control information for encrypted content in a content playback control system of Embodiment 1.

The form of license information shown in FIG. 4 may also be used. FIG. 4 is a conceptual drawing showing relationships when issuer identification information and an ID (user ID, terminal ID, or the like) are attached to license information and playback control information for encrypted content in a content playback control system of this embodiment.

As shown in FIG. 4, specified issuer identification information 302 and an ID 402 are attached to usage conditions 401 of license information 400. Also, issuer identification information 304 and an ID 404 are attached to playback control information 403.

By this means, issuer identification information 304 and an ID 404 attached to individual issuer identification information 304 can be attached to usage conditions 401 as information specifying playback control information 403 to be used. Thus, playback based only on playback control information 403 to which issuer identification information 304 and ID 404 that match issuer identification information 302 and ID 402 attached to usage conditions 401 are attached can be made possible for terminal 110.

By using ID 404 in this way, the issuer of playback control information 403 (the person indicated by the issuer identification information) can set a plurality of playback control information 403. That is to say, a plurality of playback control information 403 can be set for the same content.

Playback control information generated by playback control information generation section 103 will now be described in detail.

Playback control information is written in XML (extensible Markup Language) or the like. The information set in playback control information is restriction information such as skip prohibition, forward prohibition, prohibition of special playback such as jumping, and so forth, for specific sections divided by means of segmentation metadata.

Playback control information written in XML will now be described. First, the playback control information schema will be described using FIG. 5. FIG. 5 is a drawing showing an example of the schema of playback control information such as described above.

A playback control information schema enables segment group information stipulated by the conventional TV-Anytime Forum to be extended to a play control schema 500 that describes playback control, and playback control information to be attached on a segment-by-segment (specific section by specific section) basis.

As indicated by reference number 501 in the figure, in play control schema 500 the following are set as playback methods: play, stop, pause, forward (fast-forward), rewind, skip (time skip), jump (to a specified time), record, and copy. In addition, as indicated by reference number 502 in the figure, in play control schema 500 a true (enable)/false (disable) is set for the playback methods indicated by reference number 501.

This schema is only one example, and various other settings are also possible, such as restrictions based on playback time, restrictions based on the number of special playback times, and restrictions based on segment playback order. Special playback refers to a playback method other than normal playback ("play"), that is, a playback method whereby the user does not view a segment in detail.

As an example, there is a setting whereby, if prohibited special playback is executed by content decoding section 115, it is changed to permitted special playback.

There are also settings whereby the playback order of a plurality of contents or segments is set, and playback other than in the set playback order is prohibited, or the possible playback time of specific content or a specific section is set, and playback other than at the set time is prohibited.

A specific description of playback control information will now be described using FIG. 6 and FIG. 7. FIG. 6 and FIG. 7 are drawings showing an example of metadata describing playback control information in a content playback control system of this embodiment.

Playback control information 60 according to this embodiment is written by means of a hierarchical structural description using XML. This enables playback control information 60 to have versatility.

Specifically, playback control information 60 describes a plurality of segments 600a through 600c indicating content sections.

Segments (specific sections) 600a through 600c respectively describe titles 601a through 601c, descriptions 602a through 602c, segment IDs 603a through 603c which are the segment identification numbers, video IDs 604a through 604c which are identifiers of the video used, segment start times 605a through 605c, and segment lengths 606a through 606c.

Playback control information 60 also describes a playback method having the segment 600a through 600c organization method, restriction of playback mode, and so forth, as indicated by reference number 607.

Specifically, playback method 607 describes title 608 of playback method 607, description 609 of playback method 607, identification number 610 of playback method 607, used video identifier 615, segment list of used segment 611, and restriction information related to specific segment 612.

Segment list 611 describes the IDs of segments used in playback order. By this means, terminal 110 can be made to perform content playback in the playback order intended by the issuer of playback control information 60.

Restriction information 612 describes ID 613 of the segment subject to control, and restriction (control) methods 614a through 614c for that segment.

Specifically, <Forward> (fast-forward) prohibition is described in the area indicated by 614a, <Skip> (time skip) prohibition is described in the area indicated by 614b, and <Jump> (jump to a specified time) prohibition is described in the area indicated by 614c, that is, prohibition of a playback method whereby this segment is not played back but skipped is described. By this means, time skipping that spans specific sections (segment) of content and jumping to a specified time are prohibited. To be specific, fast-forwarding and skipping of segment 600b (CM section), and jumping from before segment 600b (CM section) to after segment 600b (CM section), are prohibited.

In this way, a plurality of segments 600a through 600c, and order and playback restriction information related to these segments 600a through 600c, are described in playback control information 60.

A description method other than the above described method may be used for playback control information. For example, if the genre code of a segment is CM, playback control information with skipping prohibited or the like set, is created. Then, playback control information processing section 117 refers to the playback control information, and if the segment information genre code is CM, content decoding section 115 is made to prohibit skipping. Moreover, operation can be implemented so that skipping is always prohibited when the segment information genre code described in the playback control information is CM, without explicitly indicating skip prohibition in playback control information.

Playback control information may also be in a form in which control information 612 is described for content that has hierarchical segments.

Figure 8:
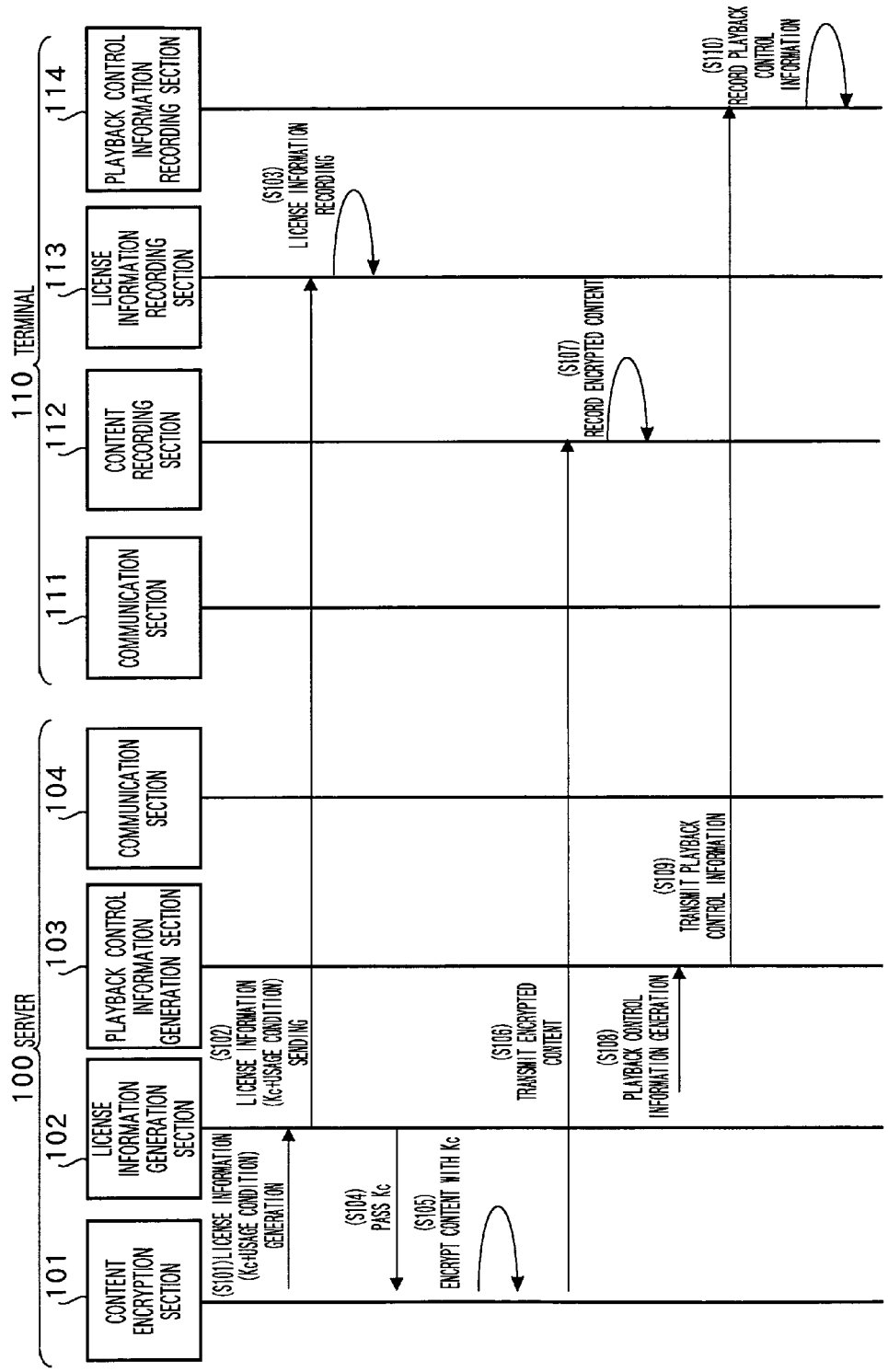
FIG. 8 is a processing flowchart up to where a terminal obtains encrypted content, license information, and playback control information from a server in a content playback control system of Embodiment 1.

Next, operations in the content playback control system shown in FIG. 1 up to where terminal 110 obtains encrypted content and its license information and playback control information from server 100 will be described with reference to the processing flow shown in FIG. 8.

First, license information generation section 102 of server 100 extracts from content key storage section 107 content key Kc (hereinafter referred to as "Kc") for encrypting content on which it is wished to perform playback control. Then license information generation section 102 generates license information containing Kc and Kc usage conditions (step S101 (hereinafter "step S" is referred to simply as "S".)) Here, license information generation section 102 describes "only playback based on playback control information is permitted for encrypted content" in the usage conditions.

Next, license information generation section 102 transmits license information generated in S101 to communication section 111 of terminal 110 via communication section 104 (S102). Here, possible methods of communication from server 100 to terminal 110 include transmission via a broadcast network, transmission by means of an IP multicast via an IP network, transmission via an IP network in response to a request from terminal 110, and so forth.

Terminal 110 then receives the license information in communication section 111, and transmits this license information to license information recording section 113. License information recording section 113 records the license information obtained via communication section 111 in a recording medium (S103).

Next, license information generation section 102 of server 100 passes Kc generated in S101 to content encryption section 101 (S104). Content encryption section 101 then obtains content from content storage section 106, and encrypts the obtained content using Kc obtained in S104 (S105).

Next, content encryption section 101 transmits the content encrypted in S105 (encrypted content) to communication section 111 of terminal 110 via communication section 104. Here, possible methods of communication from server 100 to terminal 110 include transmission via a broadcast network, transmission by means of IP multicast via an IP network, transmission via an IP network in response to a request from terminal 110, and so forth (S106).

Terminal 110 then receives the encrypted content in communication section 111, and transmits this encrypted content to content recording section 112. Content recording section 112 records the encrypted content obtained via communication section 111 in a recording medium, still in encrypted form (S107).

Next, playback control information generation section 103 of server 100 generates playback control information corresponding to the encrypted content encrypted in S105 (S108).

Playback control information generation section 103 then transmits playback control information to communication section 111 of terminal 110 via communication section 104 (S109). Here, possible methods of communication from server 100 to terminal 110 include transmission via a broadcast network, transmission by means of an IP multicast via an IP network, or transmission via an IP network in response to a request from terminal 110.

Terminal 110 then receives the playback control information in communication section 111, and transmits this playback control information to playback control information recording section 114. Playback control information recording section 114 records the playback control information obtained via communication section 111 in a recording medium (S110).

By means of the above-described processing flow, terminal 110 records encrypted content in content recording section 112, license information describing Kc for decoding encrypted content and its usage conditions in license information recording section 113, and playback control information in playback control information recording section 114.

In the above-described processing flow, terminal 110 obtains license information, encrypted content, and playback control information in that order, but the order in which these are obtained is irrelevant.

Also, there are various possible timing patterns for the acquisition of license information and playback control information by terminal 110, such as acquisition at the same time as content acquisition, acquisition when content is played back, periodic collective pre-acquisition, and so forth.

Figure 9:
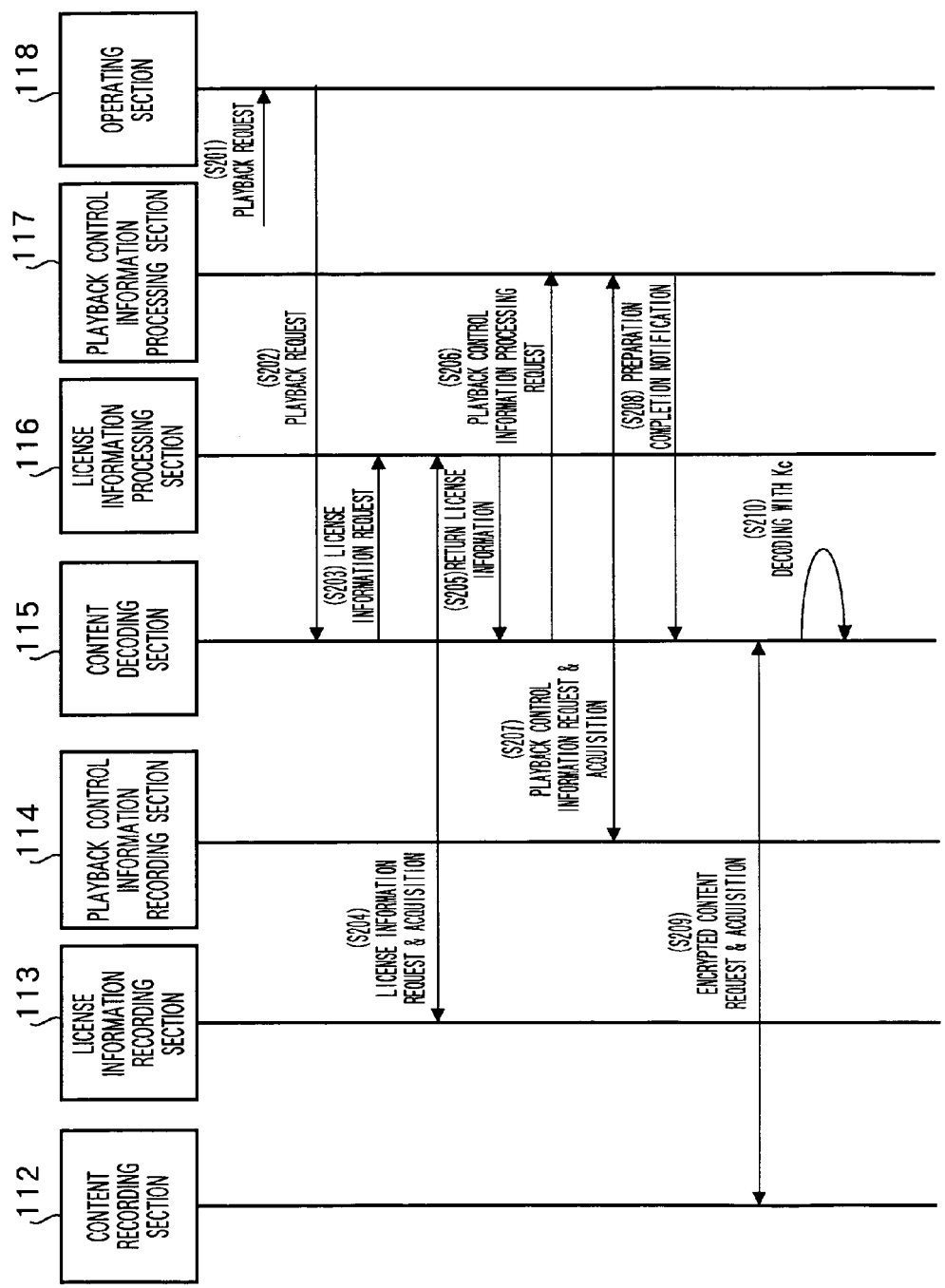
FIG. 9 is a processing flowchart up to where a terminal decodes encrypted content in accordance with license information in a content playback control system of Embodiment 1.

Next, operations where terminal 110 decodes encrypted content in accordance with license information will be described with reference to the processing flow shown in FIG. 9.

When the user requests content playback to operating section 118, operating section 118 inputs a playback request in response thereto (S201). Then operating section 118 issues a content playback request to content decoding section 115 (S202).

Next, content decoding section 115 issues a request to license information processing section 116 for license information (Kc and usage conditions) corresponding to the content (S203).

In response, license information processing section 116 obtains license information corresponding to the content from license information recording section 113 (S204).

License information processing section 116 then returns the license information to content decoding section 115 (S205). "Only playback based on playback control information is permitted for encrypted content" is described in the usage conditions contained in the license information output by license information processing section 116 here. By describing that only playback based on playback control information is permitted for encrypted content in license information in the usage conditions, terminal 110 always plays back encrypted content using playback control information.

Content decoding section 115 then obtains the license information. Next, since "only playback based on playback control information is permitted for encrypted content" is described in the usage conditions of the obtained license information, content decoding section 115 issues a request for playback control information processing to playback control information processing section 117 (S206).

In response, playback control information processing section 117 obtains playback control information corresponding to the content from playback control information recording section 114 (S207).

Here, when, for example, issuer identification information 302 and 304 are attached respectively to usage conditions 301 and playback control information 303 as shown in FIG. 3, playback control information processing section 117 obtains playback control information 303 having issuer identification information 304 which is the same as issuer identification information 302 attached to the usage conditions.

By using issuer identification information 302 and 304 indicating the issuer of playback control information in this way, only playback control information issued by the playback control information issuer is used, and content playback can be controlled as intended by the playback control information issuer.

Also, when, for example, issuer identification information 302 and 304, and IDs 402 and 404, are attached respectively to usage conditions 401 and playback control information 403 as shown in FIG. 4, playback control information processing section 117 obtains playback control information 403 having issuer identification information 304 and ID 404 which are the same as issuer identification information 302 and ID 402 attached to the usage conditions.

By this means, even if a playback control information issuer issues a plurality of playback control information, by using IDs 402 and 404, it is possible to determine which playback control information issued by the issuer should be used.

Playback control information processing section 117 then returns completion notification of control preparation for content playback according to playback control information to content decoding section 115 (S208).

Next, content decoding section 115 obtains encrypted content corresponding to the playback control information from content recording section 112 (S209). Then content decoding section 115 decrypts and plays back the encrypted content by means of Kc (S210).

By means of the above-described processing flow, terminal 110 begins content playback based on playback control information.

Figure 10:
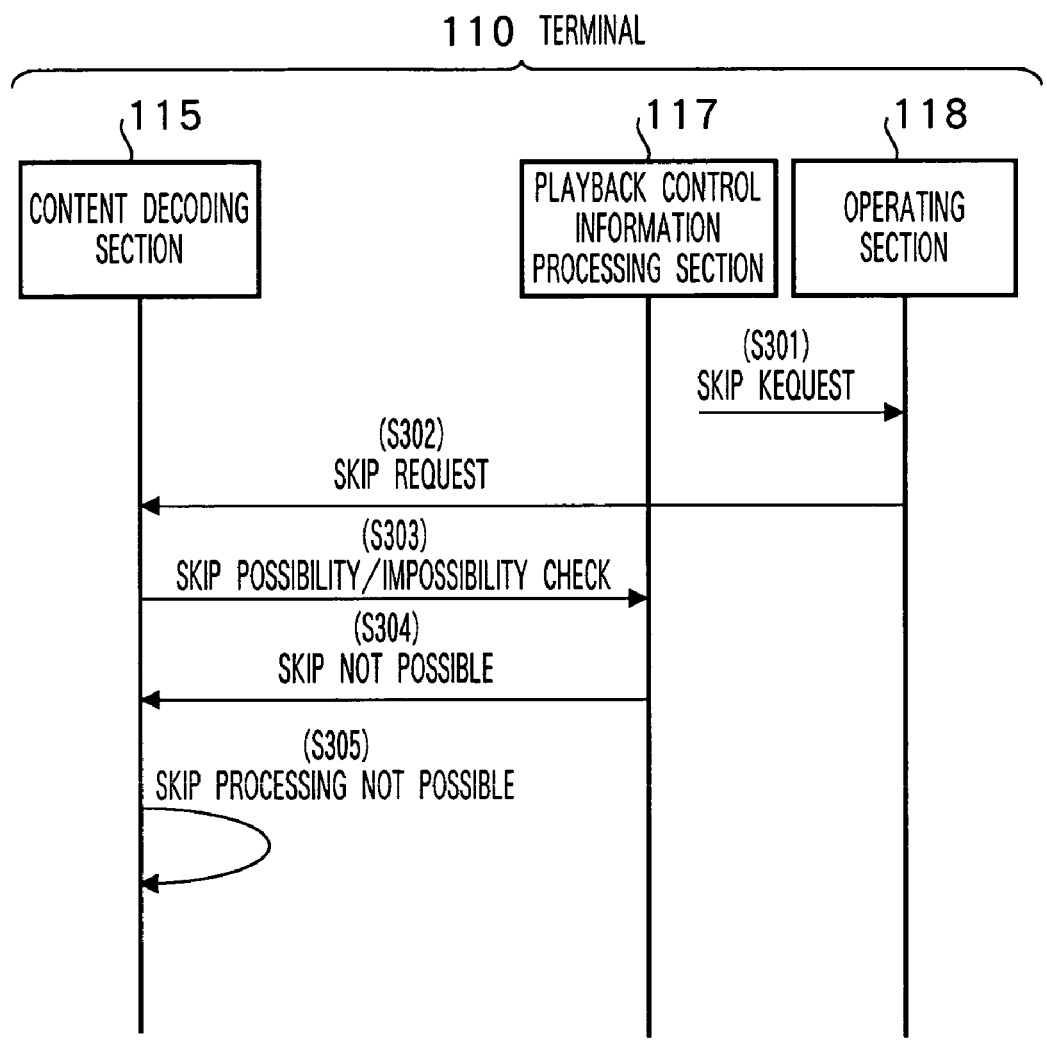
FIG. 10 is a processing flowchart showing a case where skip operation is performed in a CM section when playback based on the playback control information shown in FIG. 6 is performed in a content playback control system of Embodiment 1.

Next, the processing flow in the content playback control system shown in FIG. 1 when a skip operation is performed during a CM section while terminal 110 is performing playback based on the playback control information shown in FIG. 6 and FIG. 7 will be described with reference to the processing flow shown in FIG. 10.

When operating section 118 receives a skip request from the user during CM section playback (S301), it passes the skip request to content decoding section 115 (S302).

In response, content decoding section 115 issues a skip possibility/impossibility check request to playback control information processing section 117 (S303).

In response to this request, playback control information processing section 117 refers to playback control information, recognizes that skipping is prohibited for the segment being played back, and returns an indication that skipping is not possible to content decoding section 115 (S304).

To be specific, playback control information processing section 117 refers to restriction information 612 of playback control information 60 shown in FIG. 7. Then playback control information processing section 117 refers to ID 613 of restriction information 612 and recognizes a segment subject to restrictions. In this case, since ID 603b of CM related segment 600b is described in ID 613, playback control information processing section 117 recognizes that CM related segment 600b is subject to playback restrictions.

Next, playback control information processing section 117 refers to restriction (control) methods 614a through 614c, and more specifically, recognizes what kind of restrictions have been set for CM related segment 600b. In this case, "forward," "skip," and "jump," are specified as not possible in restriction methods 614a through 614c, and therefore playback control information processing section 117 recognizes that CM related segment 600b is a segment for which skipping is not possible. Playback control information processing section 117 then returns an indication that skipping is not possible to content decoding section 115.

In response to this, having obtained an indication that skipping is not possible in S304, content decoding section 115 does not comply with the skip request in S302, but continues content playback using the playback method currently being employed (S305).

If, at this time, a playback method already prohibited in the playback control information, such as skip or forward, is in progress, content decoding section 115 performs processing to return to a playback method permitted in the playback control information. Also, if jump processing or skip processing that skips a segment subject to control in the playback control information has been performed, content decoding section 115 discontinues this processing.

When content decoding section 115 receives an indication that skipping is not possible in S304, it may transmit a "skipping not possible" indication to output terminal 130 and notify the user that the operation is prohibited.

Also, when content decoding section 115 receives skip requests, it is possible for content decoding section 115 not to inquire about a skip possibility/impossibility to playback control information processing section 117 each time there is an operation request, but to obtain playback control information from the playback control information processing section when there is a playback request and make a decision in content decoding section 115.

By performing content playback using playback control information as described above, it is possible for terminal 110 not to accept a playback method prohibited in the restriction method described in the playback control information. That is to say, terminal 110 can be made to comply with playback intended by the playback control information issuer (broadcaster).

In this processing flow, only skipping has been taken as an example, but the same kind of processing also applies to the other operations (forward and jump) described in playback control information 60 in FIG. 6 and FIG. 7. By means of this processing flow, a terminal can be made to comply with playback based on playback control information.

As described above, according to Embodiment 1 content playback is performed based on playback control information that describes a restriction method related to the playback method (mode) of a specific section of content, and it is therefore possible to perform control related to the playback method of a specific section of content.

Furthermore, according to Embodiment 1, since a playback restriction method is described not in content itself but in playback control information, a plurality of contents need not be held for each playback control method. Also, since it is only necessary to store a comparatively small amount of playback control information for each playback control method, the storage section of terminal 110 can be made compact.

Moreover, according to Embodiment 1, since a mode is used whereby playback control information and license information are transmitted separately from server 100 to terminal 110, it is possible to prevent communication from becoming heavy due to simultaneous transmission of playback control information and license information. Also, when the communication network is heavy, playback control information may be transmitted beforehand without using communication, and only license information may be transmitted by communication. Furthermore, if a mode is adopted whereby only license information is stored in a tamper-proof security module of terminal 110, terminal implementation costs can be reduced.

Also, the validity of playback control information may be checked in terminal 110 by means of a method such as attaching an electronic signature to playback control information. By this means, it is possible to prevent content playback that runs counter to the intentions of the playback control information issuer due to tampering with the playback control information.

During playback of a section for which a predetermined operation is prohibited by playback control information, the GUI of operating section 118 may be changed as appropriate to indicate to the user that the operation is prohibited. For example, the color of the forward button on the remote controller may be changed during a section for which forwarding is prohibited, or displayed as different from the color of other non-prohibited operations, or it may be made impossible to press the forward button so that an operation prohibited by the playback control information processing section cannot be accepted by operating section 118. Another possibility is to impose a character or symbol indicating that fast-forwarding cannot be performed on the playback screen. In this case, information of an operation prohibited for the playback section is passed from playback control information processing section 117 to operating section 118, and operating section 118 changes appropriately to reflect that information.

By this means the user can easily recognize currently permitted operations and prohibited operations.

Also, preview license information and actual-viewing license information may be prepared separately for the same content, and that playback is possible for only a content preview may be described in playback control information corresponding to preview license information. By this means, a regular license purchaser may be issued an actual-viewing license and enabled to actually view content, while someone who has not purchased a regular license is issued preview license information and allowed to view only a content preview.

A mode may also be used whereby operations of server 100 or terminal 110 according to Embodiment 1 are stored in a recording medium as a program, and this program is executed by a general-purpose computer.

Embodiment 2

A content playback control system according to Embodiment 2 of the present invention performs playback possibility/impossibility control based on a time period.

Figure 11:
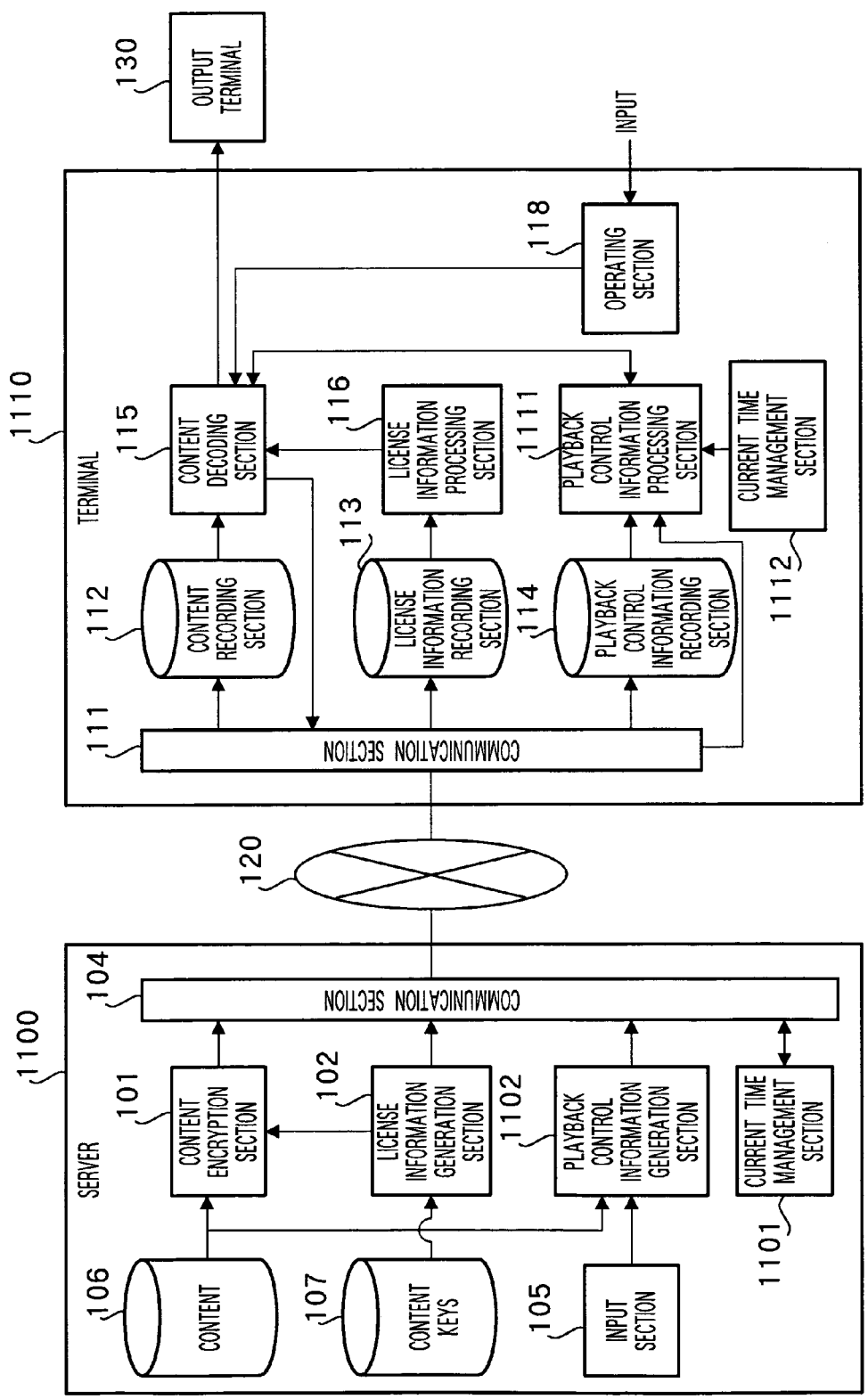
FIG. 11 is a block diagram showing the configuration of a content playback control system according to Embodiment 2 of the present invention.

FIG. 11 is a block diagram showing the configuration of a content playback control system according to Embodiment 2 of the present invention. Parts identical to parts already described in Embodiment 1 are assigned the same codes, and detailed descriptions thereof are omitted.

Terminal 1110 of a content playback control system according to Embodiment 2 is provided with current time management section 1112. Current time management section 1112 is a clock or the like that manages the current time. Server 1100 is also provided with current time management section 1101. Current time management section 1101 and current time management section 1112 have the same configuration.

Playback control information generation section 1102 of server 1100 generates playback control information describing a content playback restriction (control) method according to time information. Playback control information generation section 1102 transmits generated playback control information to terminal 1110 via communication section 104 and channel 120.

A playback control information processing section 1111 of terminal 1110 controls playback of content in content decoding section 115 based on playback control information generated by playback control information generation section 1102.

The schema of playback control information generated by playback control information generation section 1102 will now be described using FIG. 12. FIG. 12 is a drawing showing an example of the schema of playback control information according to Embodiment 2.

Playback control information schema 1200 according to Embodiment 2, makes a definition for content playback restriction information based on time as indicated by reference number 1201 in the figure. Also, schema 1200 makes a definition so as to specify content playback restriction information based on time, as indicated by reference number 1202 in the figure. Specifically, schema 1200 makes a definition for start time 1203 and end time 1204 subject to restrictions, and restriction method 1208 indicating how content playback is restricted at the restricted time.

Schema 1200 also makes a definition so as to specify where time information is to be obtained, as indicated by reference number 1205 in the figure. Specifically, schema 1200 makes a definition so as to specify whether time information is to be obtained from current time management section 1112 of terminal 1110, as indicated by reference number 1206 in the figure, or is to be obtained from current time management section 1101 of server 1100, as indicated by reference number 1207 in the figure.

A specific description of playback control information according to Embodiment 2 will now be described using FIG. 13. FIG. 13 is a drawing showing an example of metadata describing playback control information in a content playback control system of Embodiment 2.

Specifically, playback control information 1300 according to Embodiment 2 describes restriction information for one segment. To be specific, playback control information 1300 describes segment ID 1301, ID 1302 of video used in the segment, segment title 1303, segment description 1304, and segment section information 1305.

Playback control information 1300 also describes restriction information for the segment in the area indicated by reference number 1306 in the figure. Specifically, restriction information 1306 describes start time 1307 and end time 1308 subject to restrictions, and restriction method (in this example, playback impossibility) 1309 for the restricted time.

Restriction information 1306 also describes acquisition location information 1310 indicating where the current time is to be obtained. In this case, acquisition location information 1310 describes that the current time is to be obtained from current time management section 1101 of server 1100.

By obtaining the current time from server 1100 in this way, current time management can be performed accurately. Also, in terminal 1110, content playback can be controlled accurately even if time information managed by current time management section 1112 is tampered with.

Only information for one segment is described in playback control information 1300 shown in FIG. 13, but information for a plurality of segments may be described, and different restriction information may be described for each segment.

Figure 14:
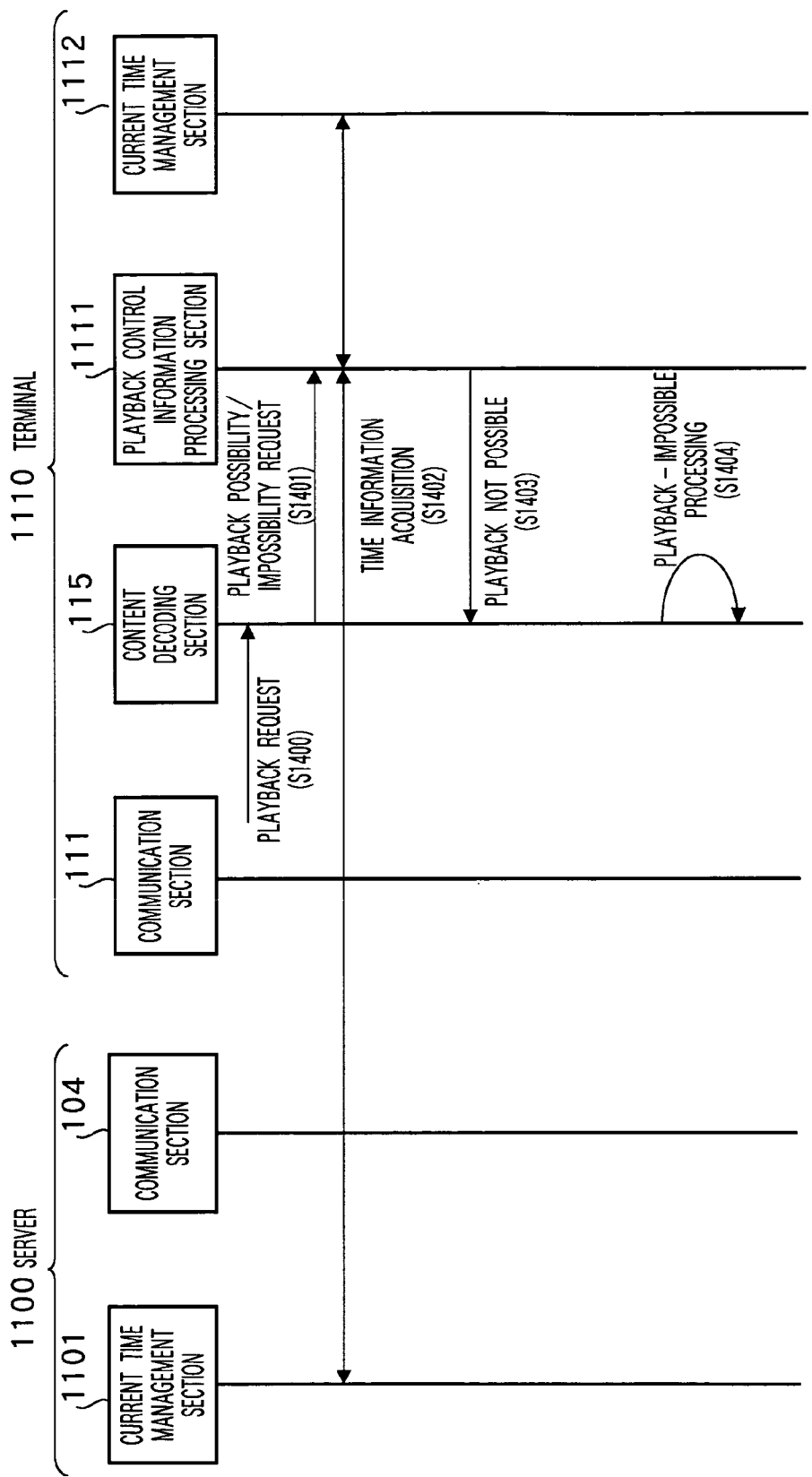
FIG. 14 is a flowchart of content playback control in a content playback control system of Embodiment 2.

Next, content playback processing in a content playback control system according to Embodiment 2 will be described with reference to the processing flow shown in FIG. 14.

When the user inputs a content playback request from operating section 118, operating section 118 transmits a content playback request to content decoding section 115 (S1400).

In response to this, content decoding section 115 transmits playback control information processing section 1111 a request for information related to playback possibility/impossibility as to whether or not content may be played back (S1401).

In response to this, playback control information processing section 1111 refers to playback control information recording section 114 and obtains playback control information.

Next, playback control information processing section 1111 refers to the playback control information and determines where the current time is to be obtained. In the case of the playback control information shown in FIG. 13, for example, the description indicates that the current time is to be obtained from current time management section 1101 of server 1100, as indicated by reference number 1301 in the figure, and therefore playback control information processing section 1111 transmits a time information acquisition request to server 1100 via communication section 111.

In response to this, server 1100 obtains a current time acquisition request via communication section 104, and transmits this to current time management section 1101. Current time management section 1101 then obtains the current time acquisition request and transmits the current time to terminal 1110 via communication section 104.

Communication section 111 of terminal 1110 then obtains the transmitted current time and transmits it to playback control information processing section 1111, and playback control information processing section 1111 obtains the current time (S1402).

If the playback control information describes an indication that the current time is to be obtained from current time management section 1112 of terminal 1110, playback control information processing section 1111 obtains the current time from current time management section 1112 (S1402).

Next, playback control information processing section 1111 refers to the playback control information, and obtains restricted time related information. In the example in FIG. 13, playback control information processing section 1111 obtains start time 1307 and end time 1308. Playback control information processing section 1111 also refers to the playback control information and obtains restriction method related information. In the example in FIG. 13, playback control information processing section 1111 obtains restriction method 1309 describing an indication that playback is not possible.

Playback control information processing section 1111 then compares the current time obtained in S1402 with restricted time related information described in the playback control information, and if these times match, transmits the restriction method described in the playback control information—in this case, an indication that content cannot be played back—to content decoding section 115 (S1403).

In response to this, content decoding section 115 performs playback impossible processing, that is, processing whereby decoding of encrypted content is not performed, and terminates processing (S1404).

As described above, according to Embodiment 2, content playback control can be performed using time information. By this means, for example, by suppressing playback of stored content at prime time, it is possible to ensure that content being broadcast is viewed.

Also, according to Embodiment 2, control can be performed so that the current time is inquired to server 1100. By this means, it is possible to prevent unauthorized use of content by tampering with the current time in terminal 1110.

It is also possible to combine Embodiment 1 and Embodiment 2, and perform control so that specific playback is impossible at a predetermined time.

Also, if a content playback request is received from operating section 118 during a playback-prohibited time period described in playback control information, that operation may be made unacceptable. To indicate that content playback cannot be performed during a playback-prohibited time period, the color of the play button or the like of operating section 118 may be changed, or an indication that content playback is not possible may be displayed.

Furthermore, if a prohibited time period is entered during content playback, content playback may be made to stop automatically.

Although playback restriction based on time has been described, playback disabling or enabling restrictions may also be implemented based on day-of-the-week or date restrictions.

Embodiment 3

A content playback control system according to Embodiment 3 of the present invention performs playback possibility/impossibility control based on a viewing environment.

Figure 15:
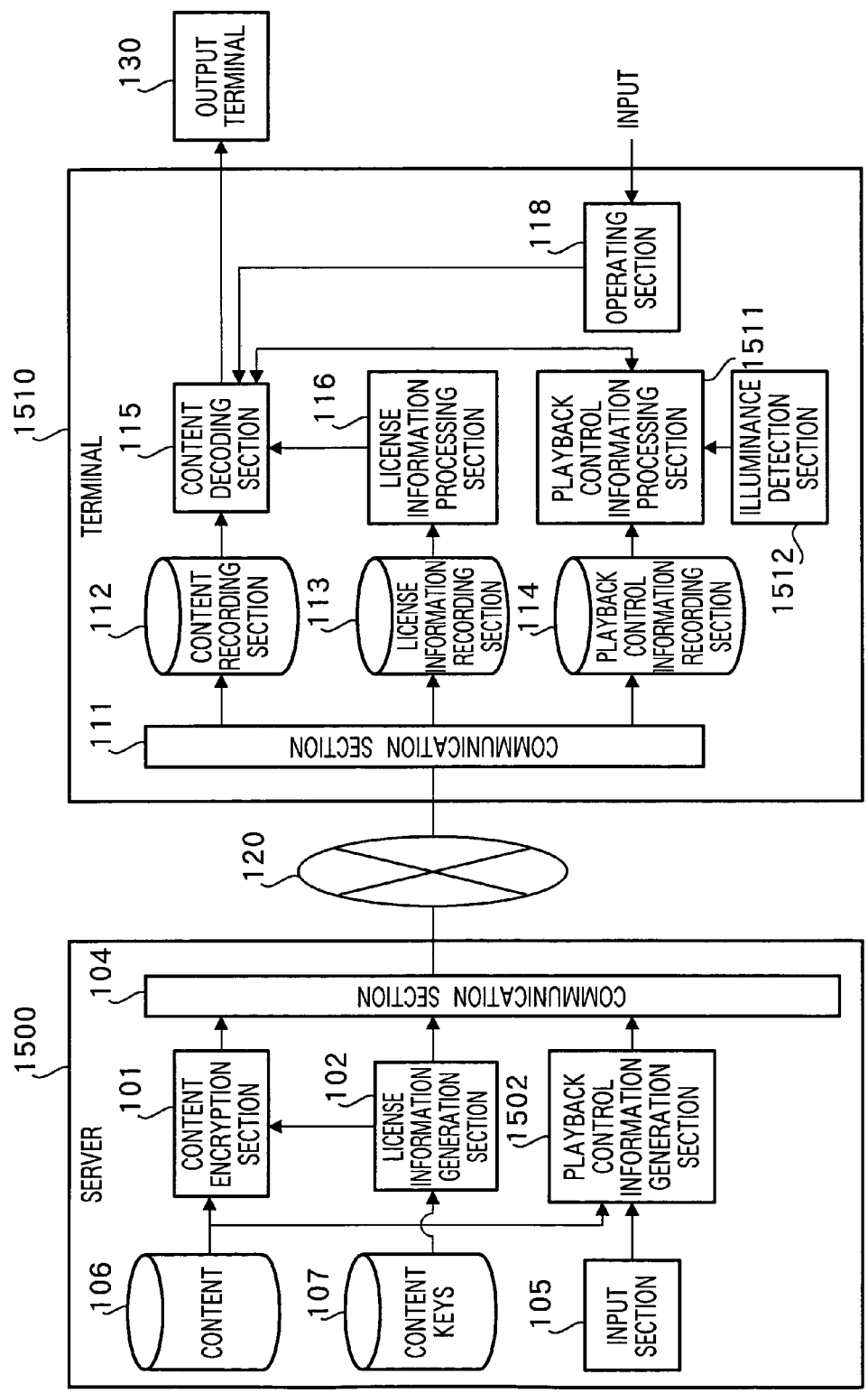
FIG. 15 is a block diagram showing the configuration of a content playback control system according to Embodiment 3 of the present invention.

FIG. 15 is a block diagram showing the configuration of a content playback control system according to Embodiment 3 of the present invention. Parts identical to parts already described are assigned the same codes, and detailed descriptions thereof are omitted.

Terminal 1510 of a content playback control system according to Embodiment 3 is provided with illuminance detection section 1512. Illuminance detection section 1512 detects the illuminance (lux) of the environment in which terminal 1510 is located.

Playback control information generation section 1502 of server 1500 generates playback control information describing content playback restriction (control) information according to illuminance information. Playback control information generation section 1502 transmits generated playback control information to terminal 1510 via communication section 104 and channel 120.

Playback control information processing section 1511 of terminal 1510 controls playback of content in content decoding section 115 based on playback control information generated by playback control information generation section 1502.

Next, the schema of playback control information generated by playback control information generation section 1502 will now be described using FIG. 16. FIG. 16 is a drawing showing an example of the schema of playback control information according to Embodiment 3.

Playback control information schema 1600 according to Embodiment 3, makes a definition for content playback restriction information based on illuminance as indicated by reference number 1601 in the figure. Also, schema 1600 makes a definition so as to specify a restriction method based on illuminance, as indicated by reference number 1602 in the figure. Specifically, schema 1600 makes a definition for minimum illuminance 1604 and maximum illuminance 1605 indicating illuminance subject to restrictions, and restriction method 1603 indicating how content is to be played back at minimum illuminance 1604 or higher and at maximum illuminance 1605 or lower.

Next, a specific description of playback control information according to Embodiment 3 will now be described using FIG. 17. FIG. 17 is a drawing showing an example of metadata describing playback control information in a content playback control system of Embodiment 3. Parts identical to parts already described are assigned the same codes, and detailed descriptions thereof are omitted.

Playback control information 1700 according to Embodiment 3 describes restriction information for the segment in the area indicated by reference number 1701 in the figure. Specifically, restriction information 1701 describes minimum illuminance 1702 subject to restrictions, and restriction method (in this example, playback possibility) 1703 in the case of minimum illuminance 1702 or higher.

Only information relating to one segment is described in playback control information 1700 shown in FIG. 17, but information for a plurality of segments may be described, and different restriction information may be described for each segment.

Figure 18:
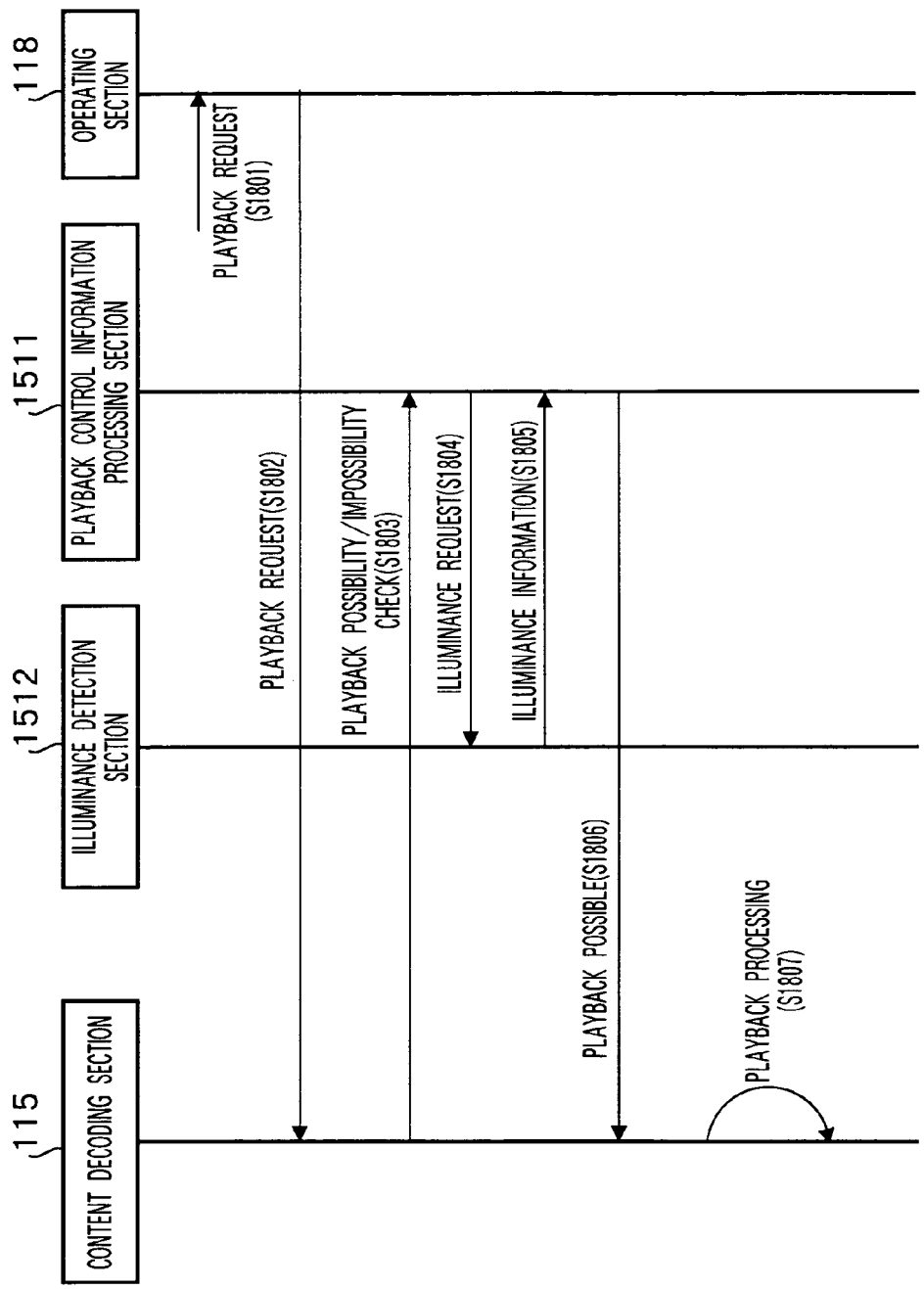
FIG. 18 is a flowchart of content playback control in a content playback control system of Embodiment 3.

Next, content playback processing in a content playback control system according to Embodiment 3 will be described with reference to the processing flow shown in FIG. 18.

When the user inputs a content playback request from operating section 118 (S1801), operating section 118 transmits a content playback request to content decoding section 115 (S1802).

In response to this, content decoding section 115 transmits a request for information related to playback possibility/impossibility as to whether or not content may be played back to playback control information processing section 1511 (S1803).

In response to this, playback control information processing section 1511 refers to playback control information recording section 114 and obtains playback control information.

Next, playback control information processing section 1511 issues a request to illuminance detection section 1512 for illuminance information concerning the environment in which terminal 1510 is located (S1804). In response to this request, illuminance detection section 1512 transmits illuminance information concerning the environment in which terminal 1510 is located to playback control information processing section 1511 (S1805)

Playback control information processing section 1511 then refers to the playback control information and obtains information relating to illuminance subject to restrictions. In the example in FIG. 17, playback control information processing section 1511 obtains minimum illuminance 1702. Playback control information processing section 1511 refers to the playback control information and obtains restriction method related information. In the example in FIG. 17, playback control information processing section 1511 obtains restriction method 1703 describing an indication that playback is possible.

Playback control information processing section 1511 then determines whether the illuminance information obtained in S1805 corresponds to the illuminance subject to restrictions described in the playback control information, and if it does, transmits the restriction method described in the playback control information—in this case, an indication that content playback is possible—to content decoding section 115 (S1806).

In response to this, content decoding section 115 performs playback processing, that is, processing whereby encrypted content is decoded and output to output terminal 130, and terminates processing (S1807)

As described above, according to Embodiment 3 content playback control can be performed using illuminance information of the environment in which terminal 1510 is located. By this means, it is possible, for example, to prevent an animation program containing scenes with sharp luminance variations from being viewed in a dark room.

Also, if a content playback request is received from operating section 118 under conditions corresponding to the playback control illuminance described in the playback control information, that operation may be made unacceptable. To indicate that content playback cannot be performed when terminal 1510 is in the illuminance subject to playback control, the color of the play button or the like of operating section 118 may be changed, or an indication that content playback is not possible may be displayed. If a playback request is made again after an indication that content playback is not possible has been displayed, the processing of S1801 through S1807 may be repeated.

Furthermore, if the environment of terminal 1510 enters the illuminance subject to playback control during content playback, playback may be made to stop automatically.

Playback control information for controlling content playback may be generated using environment information other than illuminance information, and content playback control may be performed using environment information other than illuminance information.

Embodiment 4

A content playback control system according to Embodiment 4 of the present invention performs playback possibility/impossibility control based on a user attribute.

Figure 19:
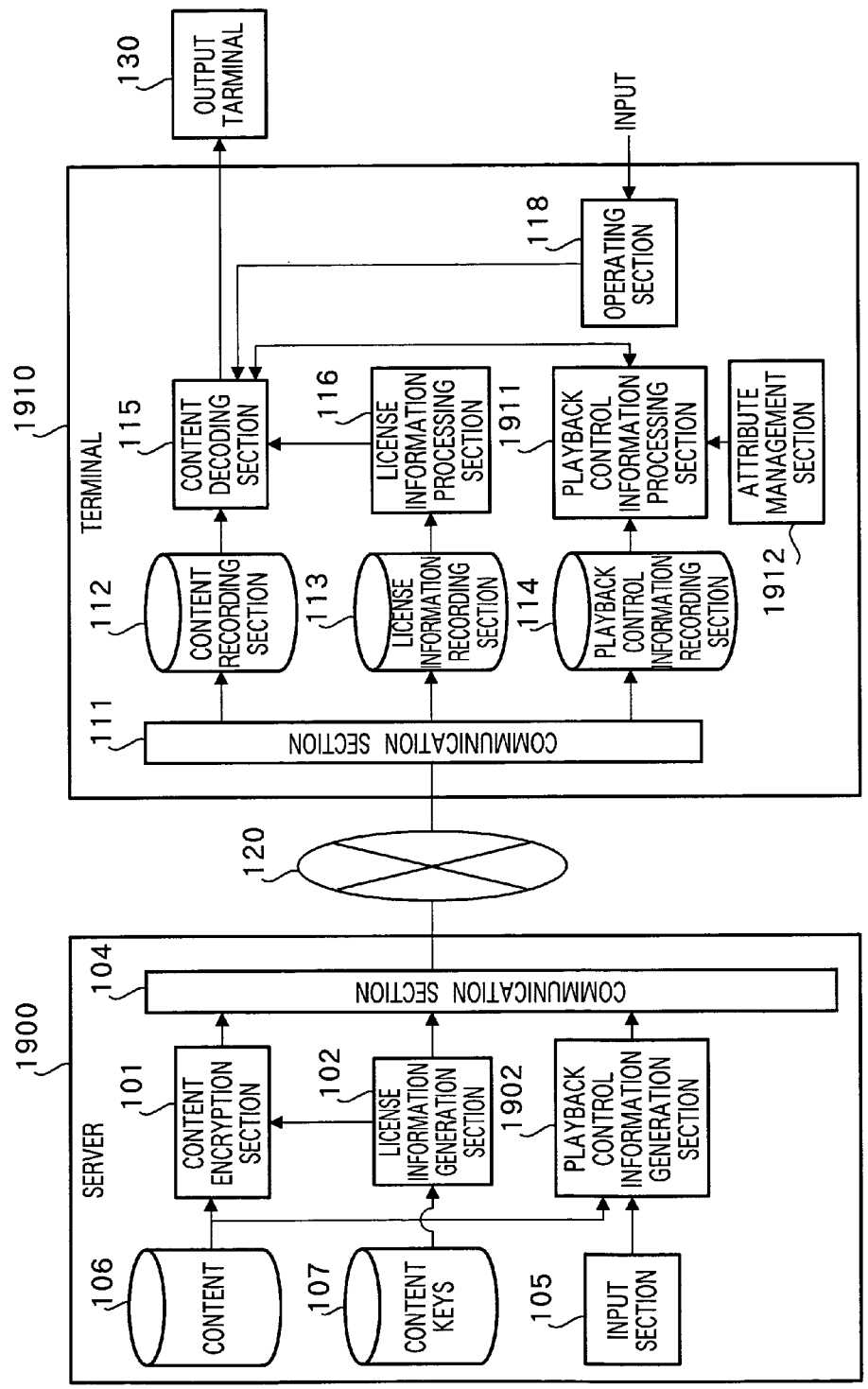
FIG. 19 is a block diagram showing the configuration of a content playback control system according to Embodiment 4 of the present invention.

FIG. 19 is a block diagram showing the configuration of a content playback control system according to Embodiment 4 of the present invention. Parts identical to parts already described are assigned the same codes, and detailed descriptions thereof are omitted.

Terminal 1910 of a content playback control system according to Embodiment 4 is provided with attribute management section 1912. Attribute management section 1912 manages information related to the user of terminal 1910, that is, a user attribute. A mode of attribute management section 1912 may be used whereby the user inputs a user attribute from an IC card or the like, or a mode may be used whereby the user inputs a user attribute from operating section 118.

User attribute information includes a user's age, a user's terminal performance, the surrounding environment of a user's terminal, a user's area information (address), and so forth. A mode may be used whereby user information managed by a provider is set in attribute management section 1912 via channel 120.

Playback control information generation section 1902 of server 1900 generates playback control information describing playback control by means of user attribute information. Playback control information generation section 1902 transmits generated playback control information to terminal 1910 via communication section 104 and channel 120.

Playback control information processing section 1911 of terminal 1910 controls playback of content in content decoding section 115 based on playback control information generated by playback control information generation section 1902.

The schema of playback control information generated by playback control information generation section 1902 will now be described using FIG. 20. FIG. 20 is a drawing showing an example of the schema of playback control information according to Embodiment 4.

Playback control information schema 2000 according to Embodiment 4 makes a definition for content playback restriction information based on a user attribute as indicated by reference number 2001 in the figure. Also, schema 2000 makes a definition so as to specify restriction information based on a user attribute, as indicated by reference number 2002 in the figure. Specifically, schema 2000 makes a definition for minimum age 2004 and maximum age 2005 subject to restrictions, and restriction method 2003 indicating how content is to be played back in the case of minimum age 2004 or higher and in the case of maximum age 2005 or lower.

A specific description of playback control information according to Embodiment 4 will now be described using FIG. 21. FIG. 21 is a drawing showing an example of metadata describing playback control information in a content playback control system of Embodiment 4. Parts identical to parts already described are assigned the same codes, and detailed descriptions thereof are omitted.

Playback control information 2100 according to Embodiment 4 describes restriction information for the segment in the area indicated by reference number 2101 in the figure. Specifically, restriction information 2101 describes minimum age 2102 subject to restrictions, and restriction method (in this example, playback possible) 2103 in the case of minimum age 2102 or higher.

Only information for one segment is described in playback control information 2100 shown in FIG. 21, but information for a plurality of segments may be described, and different restriction information may be described for each segment.

Figure 22:
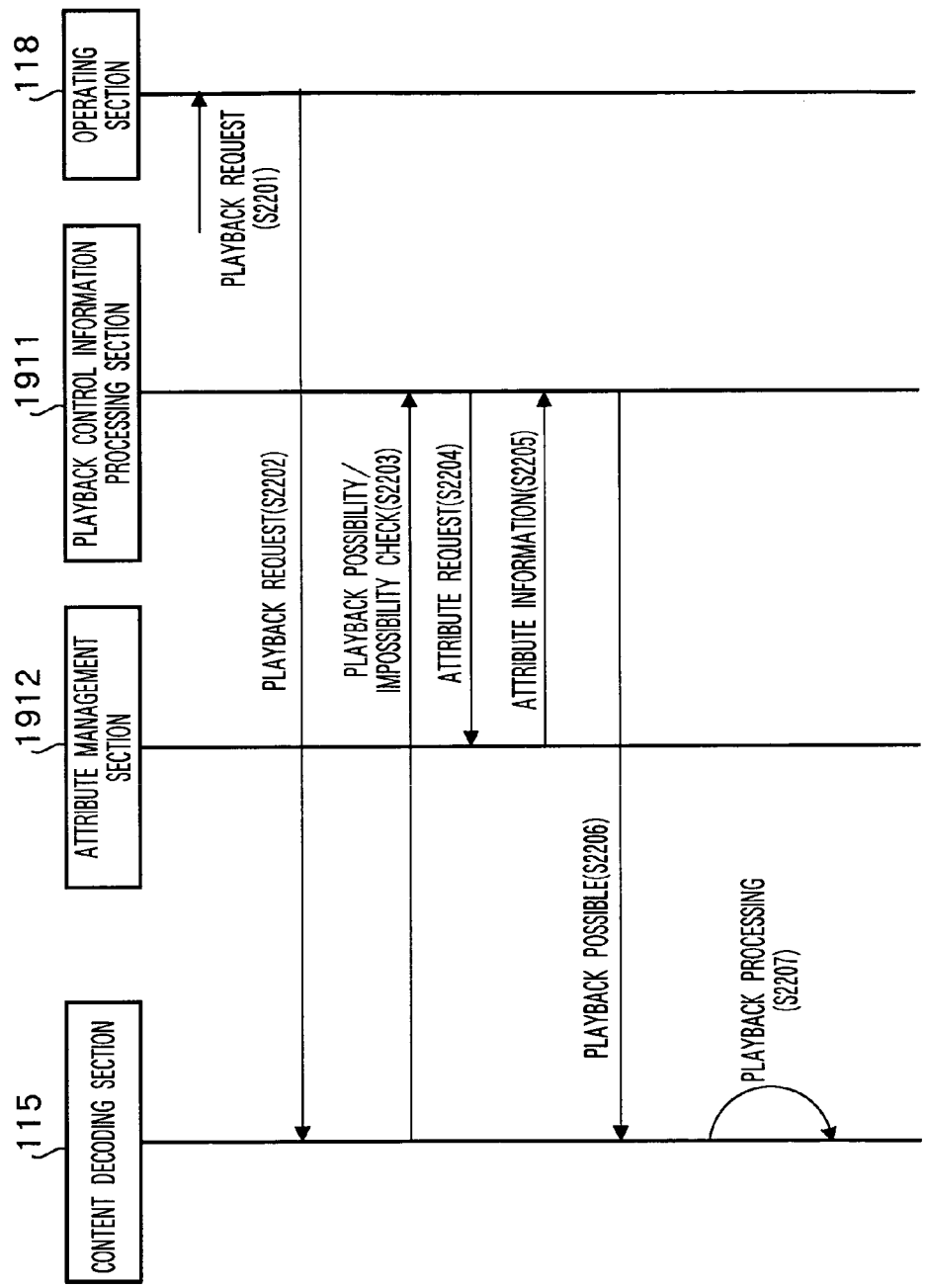
FIG. 22 is a flowchart of content playback control in a content playback control system of Embodiment 4.

Next, content playback processing in a content playback control system according to Embodiment 4 will be described with reference to the processing flow shown in FIG. 22.

When the user inputs a content playback request from operating section 118 (S2201), operating section 118 transmits a content playback request to content decoding section 115 (S2202).

In response to this, content decoding section 115 transmits a request for information related to playback possibility/impossibility as to whether or not content may be played back to playback control information processing section 1911 (S2203).

In response to this, playback control information processing section 1911 refers to playback control information recording section 114 and obtains playback control information.

Next, playback control information processing section 1911 issues a request to attribute management section 1912 for a user attribute of terminal 1910—in this case, age information (S2204). In response to this request, attribute management section 1912 transmits user age information of terminal 1910 to playback control information processing section 1911 (S2205).

Playback control information processing section 1911 then refers to the playback control information and obtains information related to an age subject to control. In the example in FIG. 21, playback control information processing section 1911 obtains minimum age 2102. Playback control information processing section 1911 refers to the playback control information and obtains restriction method related information. In the example in FIG. 21, playback control information processing section 1911 obtains restriction method 2103 describing an indication that playback is possible.

Playback control information processing section 1911 then determines whether the age information obtained in S2205 corresponds to the age subject to restrictions described in the playback control information, and if it does, transmits the restriction method described in the playback control information —in this case, an indication that content playback is possible—to content decoding section 115 (S2206).

In response to this, content decoding section 115 performs playback processing, that is, processing whereby encrypted content is decoded and output to output terminal 130, and terminates processing (S2207).

As described above, according to Embodiment 4 content playback control can be performed using a user attribute —in this case, user's age—of terminal 1910. By this means, for example, if content includes a section containing adult-oriented video, viewing of that section can be restricted to those aged 20 or over.

Also, if a content playback request is received from operating section 118 from a user of an age subject to restrictions described in the playback control information, that operation may be made unacceptable. To indicate that content playback cannot be performed when the user of terminal 1910 is of an age subject to restrictions, the color of the play button or the like of operating section 118 may be changed, or an indication that content playback is not possible may be displayed.

Schema 2000 shown in FIG. 20 may also be defined so as to specify where a user attribute is to be obtained. Specifically, schema 2000 may be defined so as to specify whether a user attribute is to be obtained from terminal 1910 or from server 1900.

Age has been used as a user attribute in the above description, but another attribute may also be used.

In Embodiment 4, content playback control based on a user attribute has been described, but content playback control may also be performed based on a terminal attribute.

In the case of this mode, attribute management section 1912 manages attribute of terminal 1910, for example, area information indicating where terminal 1910 is located.

Also, playback control information generation section 1902 of server 1900 generates playback control information describing playback control based on terminal attribute information.

A schema of playback control information generated by playback control information generation section 1902 in the case of this mode will be described using FIG. 23. FIG. 23 is a drawing showing another example of the schema of playback control information according to Embodiment 4.

Playback control information schema 2300 defines content playback restriction information based on a terminal attribute as indicated by reference number 2301 in the figure. Also, schema 2300 makes a definition so as to specify restriction information based on a terminal attribute, as indicated by reference number 2302 in the figure. Specifically, schema 2300 makes a definition for terminal attribute 2303 subject to restrictions, and restriction method 2304 indicating how content is to be played back in the case of terminal attribute 2303.

A specific description of playback control information according to this mode will now be described using FIG. 24. FIG. 24 is a drawing showing another example of metadata describing playback control information in a content playback control system of Embodiment 4. Parts identical to parts already described are assigned the same codes, and detailed descriptions thereof are omitted.

Playback control information 2400 describes playback restriction information for the segment in the area indicated by reference number 2401 in the figure. Specifically, restriction information 2401 describes a terminal attribute subject to restrictions—in this case, area information 2402—and restriction method (in this example, playback impossibility) 2403 in the case of area information 2402.

Only information for one segment is described in playback control information 2400 shown in FIG. 24, but information for a plurality of segments may be described, and different restriction information may be described for each segment.

In content playback processing in a content playback control system in this mode, playback control information processing section 1911 first issues a request to attribute management section 1912 for an attribute of terminal 1910, —in this case, a request for area information indicating where terminal 1910 is located. In response to this, attribute management section 1912 transmits area information of terminal 1910 to playback control information processing section 1911.

Playback control information processing section 1911 then refers to the playback control information and obtains information related to an area subject to control. In the example in FIG. 24, playback control information processing section 1911 obtains area information 2402. Playback control information processing section 1911 refers to the playback control information and obtains restriction method related information. In the example in FIG. 24, playback control information processing section 1911 obtains restriction method 2403 describing an indication that playback is impossible.

Playback control information processing section 1911 then determines whether the obtained area information corresponds to the area subject to restrictions described in the playback control information, and if it does, transmits the restriction method described in the playback control information—in this case, an indication that content playback is not possible—to content decoding section 115.

In response to this, content decoding section 115 performs playback-impossible processing, that is, processing whereby decoding of encrypted content is not performed, and terminates processing.

In this way, content playback control can be performed using a terminal attribute —in this case, area information—of terminal 1910. By this means, when a sports event is being broadcast, for example, more people can be induced to actually attend the event by prohibiting playback in the area around the location where the event is being held.

Content playback control may also be performed by combining Embodiment 2 through Embodiment 4, and combining time, terminal environment (illuminance) terminal user age, and terminal location. Moreover, Embodiment 1 may be combined with this and restrict special playback under the above conditions.

The present application is based on Japanese Patent Application No. 2003-366604 filed on Oct. 27, 2003, and Japanese Patent Application No. 2004-308807 filed on Oct. 22, 2004, the entire content of which is expressly incorporated herein by reference.

INDUSTRIAL APPLICABILITY

The present invention enables a terminal to be made to comply with playback based on playback control information by distributing playback control information together with content via a broadcast network, IP network, or suchlike channel, and thus enables a user to be made to comply with a content playback mode intended by a broadcaster (playback control information creator). The present invention is widely applicable not only to fixed terminals such as computers, televisions, and hard disk recorders, but also to portable terminals, in-vehicle terminals, and so forth.

The invention claimed is:

1. A content playback control method comprising:
   storing in a memory, information describing:
      a content key;
      a usage condition;
      special sections subject to a restriction of a special playback of content; and
      a playback mode permitted in each of the special sections;
      the usage condition specifying whether or not a playback is performed with respect to the special sections and the playback mode, and
      an electronic signature assigned to at least one of the special sections and the playback mode;
   at least one of the special sections and the playback mode is assigned the electronic signature and stored in a non-tamper-proof memory;
   the content key and the usage condition are stored in a tamper-proof security module;
   decoding encrypted content using the content key to generate decoded content, only when the usage condition is met;
   checking a validity of the at least one of the special sections and the playback mode to which the electronic signature is assigned, when an instructed special playback of the decoded content is performed;
   determining, when the at least one of the special sections and the playback mode to which the electronic signature is assigned is valid and the usage condition specifies the special sections of the decoded content described in the information stored in the memory, whether the special sections of the decoded content described in the information stored in the memory include a point at which the instructed special playback is performed, and
   controlling the instructed special playback for the decoded content, when the special sections include the point at which the instructed special playback is performed, and when the usage condition specifies that the playback is performed based on the playback mode described in the information stored in the memory, and a playback mode of the instructed special playback corresponds to one of the playback mode described in the information stored in the memory.

2. The content playback control method according to claim 1, wherein the special playback comprises at least one of forward, rewind, skip and jump.

3. The content playback control method according to claim 1, wherein the restriction of the special playback is described by a possibility or impossibility code.

4. The content playback control method according to claim 1, wherein each of the special sections is described on a per segment basis.

5. The content playback control method according to claim 1, wherein the information stored in the memory includes license information that manages the content key and the usage condition as a pair.

6. The content playback control method according to claim 1, wherein the usage condition is protection from unauthorized duplication or tampering by using DRM technology.

7. A content playback control terminal comprising:
   a memory that stores information comprising:
      a content key;
      a usage condition;
      special sections subject to a restriction of a special playback of content; and
      a playback mode permitted in each of the special sections;
      the usage condition specifying whether or not a playback is performed with respect to the special sections and the playback mode;
      an electronic signature assigned to at least one of the special sections and the playback mode,
   at least one of the special sections and the playback mode is assigned the electronic signature and stored in a non-tamper-proof memory;
   the content key and the usage condition are stored in a tamper-proof security module;
   a content decoder that decodes encrypted content using the content key to generate decoded content;
   a license information processor that passes the content key to the content decoder, only when the usage condition is met; and
   a playback control information processor that controls the playback of the content in the content decoder based on the special sections and the playback mode permitted in each of the special sections, wherein:
   the playback control information processor checks a validity of the at least one of the special sections and the playback mode to which the electronic signature is assigned, when an instructed special playback of the decoded content is performed,
   when the at least one of the special sections and the playback mode to which the electronic signature is assigned is valid and the usage condition specifies the special sections of the decoded content described in the information stored in the memory, the playback control information processor determines, whether the special sections of the decoded content described in the information stored in the memory include a point at which the special playback is performed, and
   when the special sections includes the point at which the instructed special playback is performed, and when the usage condition specifies that the playback is performed based on the playback mode described in the information stored in the memory, and a playback mode of the instructed special playback corresponds to the playback mode described in the information stored in the memory, the playback control information processor controls the instructed special playback for the decoded content.

8. The content playback control terminal according to claim 7, wherein the special playback comprises at least one of forward, rewind, skip and jump.

9. The content playback control terminal according to claim 7, wherein the restriction of the special playback is described by a possibility or impossibility code.

10. The content playback control terminal according to claim 7, wherein each of the special sections is described on a per-segment basis.

11. The content playback control terminal according to claim 7, wherein the usage condition is protection from unauthorized duplication or tampering by using DRM technology.

* * * * *